United States Patent
Lango et al.

(10) Patent No.: US 7,809,693 B2
(45) Date of Patent: Oct. 5, 2010

(54) SYSTEM AND METHOD FOR RESTORING DATA ON DEMAND FOR INSTANT VOLUME RESTORATION

(75) Inventors: Jason Ansel Lango, Mountain View, CA (US); Yong Eun Cho, Cambell, CA (US); Paul Christopher Eastham, Mountain View, CA (US); Ling Zheng, Sunnyvale, CA (US); Stephen L. Manley, Pleasanton, CA (US); John K. Edwards, Sunnyvale, CA (US); Robert M. English, Menlo Park, CA (US); Emmanuel Ackaouy, Cambridge (GB)

(73) Assignee: NetApp, Inc., Sunnyvale, CA (US)

( * ) Notice: Subject to any disclaimer, the term of this patent is extended or adjusted under 35 U.S.C. 154(b) by 333 days.

(21) Appl. No.: 11/409,626

(22) Filed: Apr. 24, 2006

(65) Prior Publication Data
US 2007/0124341 A1    May 31, 2007

Related U.S. Application Data

(63) Continuation-in-part of application No. 10/361,303, filed on Feb. 10, 2003, now Pat. No. 7,197,490.

(60) Provisional application No. 60/674,430, filed on Apr. 25, 2005.

(51) Int. Cl.
*G06F 17/30* (2006.01)
*G06F 15/16* (2006.01)

(52) U.S. Cl. ........................ 707/679; 707/686

(58) Field of Classification Search ............ 707/202, 707/679, 686
See application file for complete search history.

(56) References Cited

U.S. PATENT DOCUMENTS

| 4,156,907 A | 5/1979 | Rawlings et al. |
| 4,399,503 A | 8/1983 | Hawley |
| 4,408,273 A | 10/1983 | Plow |

(Continued)

FOREIGN PATENT DOCUMENTS

EP    1349089    1/2003

(Continued)

OTHER PUBLICATIONS

Azagury et al., Point-in-Time Copy: Yesterday, Today and Tomorrow, IBM 2002.*

(Continued)

*Primary Examiner*—Tony Mahmoudi
*Assistant Examiner*—Brittany N McCue
(74) *Attorney, Agent, or Firm*—Cesari and McKenna, LLP

(57) ABSTRACT

A technique is disclosed for restoring data of sparse volumes, where one or more block pointers within the file system structure are marked as ABSENT, and fetching the appropriate data from an alternate location on demand. Client data access requests to the local storage system initiate a restoration of the data from a backing store as required. A demand generator can also be used to restore the data as a background process by walking through the sparse volume and restoring the data of absent blocks. A pump module is also disclosed to regulate the access of the demand generator. Once all the data has been restored, the volume contains all data locally, and is no longer a sparse volume.

38 Claims, 12 Drawing Sheets

U.S. PATENT DOCUMENTS

| | | | |
|---|---|---|---|
| 4,598,357 | A | 7/1986 | Swenson et al. |
| 4,688,221 | A | 8/1987 | Nakamura et al. |
| 4,698,808 | A | 10/1987 | Ishii |
| 4,761,785 | A | 8/1988 | Clark et al. |
| 4,805,090 | A | 2/1989 | Coogan |
| 4,837,675 | A | 6/1989 | Bean et al. |
| 4,864,497 | A | 9/1989 | Lowry et al. |
| 4,896,259 | A | 1/1990 | Jacobs et al. |
| 4,899,342 | A | 2/1990 | Potter et al. |
| 4,989,206 | A | 1/1991 | Dunphy, Jr. et al. |
| 5,124,987 | A | 6/1992 | Milligan et al. |
| RE34,100 | E | 10/1992 | Hartness |
| 5,155,835 | A | 10/1992 | Belsan |
| 5,163,131 | A | 11/1992 | Row et al. |
| 5,355,453 | A | 10/1994 | Row et al. |
| 5,426,747 | A | 6/1995 | Weinreb et al. |
| 5,485,579 | A | 1/1996 | Hitz et al. |
| 5,519,844 | A | 5/1996 | Stallmo |
| 5,535,381 | A | 7/1996 | Kopper |
| 5,568,455 | A | 10/1996 | Balsom |
| 5,581,724 | A | 12/1996 | Belsan et al. |
| 5,802,366 | A | 9/1998 | Row et al. |
| 5,819,292 | A | 10/1998 | Hitz et al. |
| 5,918,229 | A | 6/1999 | Davis et al. |
| 5,931,918 | A | 8/1999 | Row et al. |
| 5,941,972 | A | 8/1999 | Hoese et al. |
| 5,963,962 | A | 10/1999 | Hitz et al. |
| 5,974,544 | A | 10/1999 | Jeffries et al. |
| 5,978,792 | A | 11/1999 | Bhargava et al. |
| 6,038,570 | A | 3/2000 | Hitz et al. |
| 6,065,037 | A | 5/2000 | Hitz et al. |
| 6,229,806 | B1 | 5/2001 | Lockhart et al. |
| 6,269,431 | B1 * | 7/2001 | Dunham ............... 711/162 |
| 6,360,330 | B1 * | 3/2002 | Mutalik et al. ............ 714/4 |
| 6,425,035 | B2 | 7/2002 | Hoese et al. |
| 6,493,718 | B1 | 12/2002 | Petculescu et al. |
| 6,513,051 | B1 | 1/2003 | Bolosky et al. |
| 6,574,618 | B2 | 6/2003 | Eylon et al. |
| 6,629,138 | B1 * | 9/2003 | Lambert et al. ........... 709/224 |
| 6,636,879 | B1 | 10/2003 | Doucette et al. |
| 6,643,654 | B1 | 11/2003 | Patel et al. |
| 6,735,601 | B1 * | 5/2004 | Subrahmanyam ........ 707/200 |
| 6,772,161 | B2 | 8/2004 | Mahalingam et al. |
| 6,804,690 | B1 | 10/2004 | Dysert et al. |
| 6,895,413 | B2 | 5/2005 | Edwards |
| 7,043,503 | B2 | 5/2006 | Haskin et al. |
| 7,107,385 | B2 | 9/2006 | Rajan et al. |
| 7,171,469 | B2 | 1/2007 | Ackaouy et al. |
| 7,191,290 | B1 | 3/2007 | Ackaouy et al. |
| 7,197,490 | B1 | 3/2007 | English |
| 7,296,068 | B1 | 11/2007 | Sarma et al. |
| 7,426,617 | B2 | 9/2008 | Stager et al. |
| 7,447,937 | B2 * | 11/2008 | Grubbs et al. ............. 714/6 |
| 7,631,078 | B2 | 12/2009 | Ackaouy et al. |
| 2002/0035672 | A1 | 3/2002 | Challenger et al. |
| 2002/0083037 | A1 | 6/2002 | Lewis et al. |
| 2002/0112022 | A1 | 8/2002 | Kazar et al. |
| 2002/0194484 | A1 | 12/2002 | Bolosky et al. |
| 2003/0018878 | A1 * | 1/2003 | Dorward et al. .......... 711/216 |
| 2003/0115434 | A1 | 6/2003 | Mahalingam et al. |
| 2003/0126107 | A1 * | 7/2003 | Yamagami ................. 707/1 |
| 2003/0158863 | A1 | 8/2003 | Haskin et al. |
| 2003/0158873 | A1 * | 8/2003 | Sawdon et al. ............ 707/204 |
| 2003/0182253 | A1 | 9/2003 | Chen et al. |
| 2003/0195887 | A1 * | 10/2003 | Vishlitzky et al. ........ 707/10 |
| 2004/0019615 | A1 * | 1/2004 | Sutoh et al. ............... 707/202 |
| 2004/0030668 | A1 | 2/2004 | Pawlowski et al. |
| 2004/0030822 | A1 | 2/2004 | Rajan et al. |
| 2004/0054748 | A1 | 3/2004 | Ackaouy et al. |
| 2004/0054777 | A1 | 3/2004 | Ackaouy et al. |
| 2004/0117437 | A1 | 6/2004 | Frank |
| 2004/0186961 | A1 | 9/2004 | Kimura et al. |
| 2004/0268068 | A1 | 12/2004 | Curran et al. |
| 2005/0021566 | A1 | 1/2005 | Mu |
| 2005/0050110 | A1 | 3/2005 | Sawdon et al. |
| 2005/0114289 | A1 | 5/2005 | Fair |
| 2005/0114672 | A1 | 5/2005 | Duncan et al. |
| 2005/0154825 | A1 | 7/2005 | Fair et al. |
| 2005/0240725 | A1 | 10/2005 | Robinson et al. |
| 2005/0246382 | A1 | 11/2005 | Edwards et al. |
| 2005/0246401 | A1 | 11/2005 | Edwards et al. |
| 2006/0036676 | A1 | 2/2006 | Cardone et al. |
| 2006/0085471 | A1 | 4/2006 | Rajan et al. |
| 2006/0136418 | A1 | 6/2006 | Hudis et al. |
| 2006/0179261 | A1 | 8/2006 | Rajan et al. |
| 2007/0088929 | A1 | 4/2007 | Hanai et al. |

FOREIGN PATENT DOCUMENTS

| | | |
|---|---|---|
| WO | WO 89/10594 | 11/1989 |

OTHER PUBLICATIONS

Caplinger, "An Information System Based on Distributed Objects", 1987, ACM.*

Notification of Transmittal of the International Search Report and the Written Opinion of the International Searching Authority, or the Declaration. Apr. 24, 2006. PCT/US 2006/015442.

Administration Guide found at http://www.openafs.org/pages/doc/AdminGuide/auagd010.htm, visited on Mar. 2, 2005.

Basilico, et al., *Error Correction System Using "Shadow Memory,"* IBM Technical Disclosure Bulletin, May 1984, pp. 5792-5793.

Bitton, Dina, *Disk Shadowing,* Proceedings of the 14$^{th}$ VLDB Conference, LA, CA (1988).

Blasgen, M.W. et al., *System R:An architectural Overview,* Reprinted from IBM Systems Journal vol. 20, No. 1, 1981 © 1981, 1999.

Borenstein, Nathaniel S., *CMU's Andrew project a retrospective,* Communications of ACM, (39)12, Dec. 1996.

Brown, Mark R. et al., *The Alpine file system,* ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system,* In Proceedings of the USENIX Winter 1992.

Clark, B.E., et al., *Application System /400 Performance Characteristics,* IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?(copy of article I have has no date or cite).

Gait, Jason, *Phoenix: A Safe In-Memory File System.* Communications of the ACM, 33(1):81-86, Jan. 1990.

Hartman, John H. et al., *Performance Measurements of a Multiprocessor Sprite Kernel,* Proceedings of the USENIX Conference, 1990.

Hitz, Dave et al., *File System Design for an NFS File Server Appliance,* Technical Report 3002, Rev. C395, presented Jan. 19, 1994.

Howard, John H, et al. *Scale and Performance in a Distributed File System,* Carnegie Mellon University, CMU-ITC-87-068, Aug. 5, 1987.

Howard, John, H. et al., *Scale and performance in a distributed file system,* ACM Trans. Computer. System., 6(1), Feb. 1988 pp. 51-81.

Howard, John H., *An Overview of the Andrew File System,* Carnegie Mellon University, CMU-ITC-88-062.

*The IBM System/38,* Chapter 8, pp. 137-15.

Isomaki, Markus, *Differentiated Service for the Internet,* Department of Technical Physics and Mathematics, May 9, 1998.

Kazar, Michael L., et al., *Decorum File System Architectural Overview,* USENIX Summer Conference, Anaheim, California, 1990.

Lango, Jason, et al., *Architecture for Supporting Sparse Volumes,* USPTO U.S. Appl. No. 60/674,641. Apr. 25, 2005.

Lango, Jason, et al., *Architecture for Supporting Sparse Volumes*, USPTO U.S. Appl. No. 11/409,624. Apr. 24, 2006.

Lango, Jason, et al., *System and Method for Restoring Data on Demand for Instant Volume Restoration,*, USPTO U.S. Appl. No. 60/674,430. Apr. 25, 2005.

Lango, Jason, et al., *System and Method for Sparse Volumes*, USPTO U.S. Appl. No. 11/409,887. Apr. 24, 2006.

Lango, Jason., *System and Method for Sparse Volumes*, USPTO U.S. Appl. No. 60/674,611. Apr. 25, 2005.

Lomet, David., et al., *The performance of a multiversion access method*, ACM SIGMOD International Conference on Management of Data, 19:353-363.

Lorie, Raymond, A, *Physical integrity in a large segmented database*, ACM Trans. Database Systems, (2)1:91-104, Mar. 1977.

Lorie, Ra, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective On The Sprite Network Operating System,* found at http://www.cs.berkeley.edu/projects/sprite/retrospective.html,visited on Mar. 11, 2005.

Patterson, D., et al., *A Case for Redundant Arrays of Inexpensive Disks (Raid)*, Technical Report, CSD-87-391, Computer Science Division, Electrical Engineering and Computer Sciences, University of California at Berkeley (1987).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager,* Computer Science Division, Electrical Engin. And Computer Sciences, Univ. of CA, presented at Summer '90 USENIX Technical Conference, Anaheim, CA Jun. 1990.

Rosenblum, Mendel, et al, *The Design and Implementation of a Log-Structured File System* Jul. 24, 1991 pp. 1-15.

Rosenblum, Mendel, et al., *The Design and Implementation of a Log-Structured File System,* , In Proceedings of ACM Transactions on Computer Systems, (10)1:26-52, Feb. 1992.

Sandberg, Russel et al., *Design and implementation of the Sun Network Filesystem.* In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design,* In Proceedings of the 10th ACM Symposium on Operating Systems Principles, (19)5:56-67, Dec. 1985.

Satyanarayanan,.M.. *A survey of distributed file-systems.* Annual Review of Computing Science, 4(73-104), 1989.

Satyanarayanan, M., et al, *Coda: A highly available file system for a distributed workstation environment* Carnegie Mellon University, CMU-ITC.

Satyanarayanan, M., et al, *Coda: A highly available file system for a distributed workstation environment.* IEEE Transactions on Computers, 39(4):447-459, 1990.

Satyanarayanan, Mahadev, *Scalable, Secure, and Highly Available Distributed File Access,* Computer May 1990:9-21.

Sidebotham, Bob, *Volumes: The Andrew File System Data Structuring Primitive,* EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System,* Computer Science Division, Department of Electrical Engineering and Computer Sciences, Univ. of CA, Berkley, Apr. 1988.

Welch, Brent B., et al., *Pseudo-File-Systems,* Computer Science Division, Department of Electrical Engineering and Computer Sciences, Univ. of CA, Berkley, Oct. 1989.

Wittle, Mark, et al, *LADDIS: The next generation in NFS file server benchmarking,* USENIX Association Conference Proceedings, Apr. 1993.

Cramer et al. "System and Method for Associating a Network Address with a Storage Device", U.S. Appl. No. 10/138,918, filed May 3, 2002, 35 pages.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

Black, David L. "Scheduling and Resource Management Techniques for Multiprocessors", Jul. 1990, CMU-CS-90-152.

Akyurek, Sedat. "Placing Replicated Data to Reduce Seek Delays", Department of Computer Science, University of Maryland, UMIACS-TR-91-121, CS-TR-2746, Aug. 1991.

Chaudhuri, Surajit, et al., Self-Tuning Technology in Microsoft SQL Server, Data Engineering Journal 22, 2 1999 pp. 20-27.

Coyne, Robert A., et al., Storage Systems for National Information Assets, Proc. Supercomputing 92, Minneapolis, Nov. 1992, pp. 626-633.

Finlayson, Ross S., et al., Log Files: An Extended File Service Exploiting Write-Once Storage Department of Computer Science, Stanford University, Report No. STAN-CS-87-1177, Sep. 1987.

Gray, Jim, et al., The Recovery Manager of the System R Database Manager, ACM Computing Surveys, (13)2:223-242 1981.

Hecht, Matthew S., et al. Shadowed Management of Free Disk Pages with a Linked List, ACM Transactions on Database Systems, 8/4, Dec. 1983, pp. 503-514.

Kazar, Michael Leon, Synchronization and Caching Issues in the Andrew File System, Carnegie Mellon University, CMU-ITC-88-063.

Kemper, Alfons, et al., Performance Tuning for SAP R/3, Data Engineering Journal 22, 2 1999 pp. 33-40.

Kent, Jack et al., Optimizing Shadow Recovery Algorithms, IEEE Transactions on Software Engineering, 14( 2): 155-168 , Feb. 1988.

Kistler, et al., Disconnected Operation in the Coda File System, ACM Transactions on Computer Systems, vol. 10, No. 1, Feb. 1992, pp. 3-25.

Schiefer, Berni, et al., DB2 Universal Database Performance Tuning, Data Engineering Journal 22, 2 1999 pp. 12-19.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shasha, Dennis, Tuning Time Series Queries in Finance: Case Studies and Recommendations, Data Engineering Journal 22, 2 1999 pp. 41-47.

Subramanian, Muralidhar, et al., Performance Challenges in Object-Relational DBMSs, Data Engineering Journal 22, 2 1999 pp. 28-32.

Weikum, Gerhard, et al., Towards Self-Tuning Memory Management for Data Servers, Data Engineering Journal 22, 2 1999 pp. 3-11.

West, Michael, et al. The ITC Distributed File System: Prototype and Experience, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

"Notification of Transmittal of the International Search Report and the Written Opinion of the International Searching Authority, or the Declaration", PCT/US2006/015242, mailed Apr. 24, 2006.

Kaczmarski et al. "Beyond Backup Toward Storage Management", IBM Systems Journal, vol. 42, No. 2, 2003.

Wilhelm-Olson et al. "Data Protection Strategies for Network Appliance Storage Systems", Apr. 25, 2003.

Burns et al., Storage Virtualization—Definition Why, What, Where, and How?, Nov. 1, 2004.

Kang et al. "Improving Storage System Flexibility Through Virtual Allocation", Department of Electrical Engineering, Texas A&M University, College Station, Texas.

Lango, Jason, System and Method for Caching Network File Systems, U.S. Appl. No. 60/674,609, filed Apr. 25, 2005, 52 pages.

Rosenblum, Mendel, The Design and Implementation of a Log-Structured File System, 1992, pp. 1-93.

Godbole, Rajesh, An Introduction to FlexCache Volumes / Implementing File Caching on Filers, Network Appliance, Inc., May 2005, pp. 1-14, TR3399.

"Notification of Transmittal of the International Search Report and the Written Opinion of the International Searching Authority, or the Declaration", mailed Apr. 24, 2006, International Application No. PCT/US2006/015279, 7 pages.

Kim et al., Exploiting Metadata of Absent Objects for Proxy Cache Consistency, IEICE Transactions on Communications, vol. E-84B, No. 5, May 2001, pp. 1406-1412.

Miller, Ethan L., et al., RAMA: A File System for Massively Parallel Computers, 12.sup.th IEEE Symposium on Mass Storage Systems, Monterey CA, Apr. 1993, pp. 163-168.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17):3:109-16 (Sep. 1988).

Invitation to Pay Additional Fees. PCT/US2006/015442. Apr. 24, 2006.

* cited by examiner

SYSTEM AND METHOD FOR RESTORING DATA ON DEMAND FOR INSTANT VOLUME RESTORATION

CROSS-REFERENCE TO RELATED APPLICATIONS

The present application claims the benefit of U.S. Provisional Patent Application Ser. No. 60/674,430, which was filed on Apr. 25, 2005, by Jason Ansel Lango for a SYSTEM AND METHOD FOR RESTORING DATA ON DEMAND FOR INSTANT VOLUME RESTORATION and is hereby incorporated by reference.

This application is a continuation in part application of U.S. patent application Ser. No. 10/361,303, entitled SYSTEM AND METHOD FOR LAZY-COPY SUB-VOLUME LOAD BALANCING IN A NETWORK ATTACHED STORAGE POOL, by Robert M. English, filed Feb. 10, 2003, now issued as U.S. Pat. No. 7,197,490 on Mar. 27, 2007, the contents of which are herby incorporated by reference.

This application is also, related to U.S. patent application Ser. No. 11/409,624, entitled SYSTEM AND METHOD FOR SPARSE VOLUMES, by Jason Lango, et al., and U.S. patent application Ser. No. 11/409,624, entitled ARCHITECTURE FOR SUPPORT OF SPARSE VOLUMES, by Jason Lango et al., the contents of which are hereby incorporated by reference.

FIELD OF THE INVENTION

The present invention relates to file systems, and more specifically, to a file system that includes volumes having one or more files with absent blocks that can be restored on demand.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage volumes of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data stripes across a given number of physical disks in the RAID group, and the appropriate storing of redundant information (parity) with respect to the striped data. The physical disks of each RAID group may include disks configure to store striped data (i.e., data disks) and disks configure to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each on-disk file may be implemented as set of data structures, i.e., disk blocks, configured to store information, such as the actual data for the file. The data blocks may be utilized to store both user data and also metadata within the file system. These data blocks are organized within a volume block number (vbn) space. The file system, which controls the use and contents of blocks within the vbn space, organizes the data blocks within the vbn space as a logical volume; each logical volume may be, although is not necessarily, associated with its own file system. The file system typically consists of a contiguous range of vbns from zero to n−1, for a file system of size n blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may also opt to maintain a near optimal layout such that the data is substantially contiguously arranged on disks. The optimal disk layout results in efficient access operations, particularly for sequential read operations, directed to the disks. An example of a write-anywhere file system that is configure to operate on a storage system is the Write Anywhere File Layout (WAFL™) file system available from Network Appliance, Inc., Sunnyvale, Calif.

The storage operating system may further implement a storage module, such as a RAID system, that manages the storage and retrieval of the information to and from the disks in accordance with input/output (I/O) operations. The RAID system is also responsible for parity operations in the storage system. Note that the file system only "sees" the data disks within its vbn space; the parity disks are hidden from the file system and, thus, are only visible to the RAID system. The RAID system typically organizes the RAID groups into one large physical disk (i.e., a physical volume), such that the disk blocks are concatenated across all disks of all RAID groups. The logical volume maintained by the file system is then "disposed over" (spread over) the physical volume maintained by the RAID system.

The storage system may be configured to operate according to a client/server model of information delivery to thereby allow many clients to access the directories, files and blocks stored on the system. In this model, the client may comprise an application, such as a database application, executing on a computer that connects to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

When accessing a block of a file in response to servicing a client request, the file system specifies a vbn that is translated at the file system/RAID system boundary into a disk block number (dbn) location on a particular disk (disk, dbn) within a RAID group of the physical volume. It should be noted that a client request is typically directed to a specific file offset, which is then converted by the file system into a file block number (fbn), which represents a block offset into a particular file. For example, if a file system is using 4 KB blocks, fbn 6 of a file represents a block of data starting 24 KB into the file and extending to 28 KB, where fbn 7 begins. The fbn is converted to an appropriate vbn by the file system. Each block in the vbn space and in the dbn space is typically fixed, e.g., 4 K bytes (KB), in size; accordingly, there is typically a one-to-one mapping between the information stored on the disks in the dbn space and the information organized by the file system in the vbn space. The (disk, dbn) location specified by the RAID system is further translated by a disk driver system of the storage operating system into a plurality of sectors (e.g., a 4 KB block with a RAID header translates to 8 or 9 disk sectors of 512 or 520 bytes) on the specified disk.

The requested block is then retrieved from disk and stored in a buffer cache of the memory as part of a buffer tree of the file. The buffer tree is an internal representation of blocks for a file stored in the buffer cache and maintained by the file system. Broadly stated, the buffer tree has an inode at the root (top-level) of the file. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Each pointer may be embodied as a vbn to facilitate efficiency among the file system and the RAID system when accessing the data on disks.

The RAID system maintains information about the geometry of the underlying physical disks (e.g., the number of blocks in each disk) in raid labels stored on the disks. The RAID system provides the disk geometry information to the file system for use when creating and maintaining the vbn-to-disk,dbn mappings used to perform write allocation operations and to translate vbns to disk locations for read operations. Block allocation data structures, such as an active map, a snapmap, a space map and a summary map, are data structures that describe block usage within the file system, such as the write-anywhere file system. These mapping data structures are independent of the geometry and are used by a write allocator of the file system as existing infrastructure for the logical volume. Examples of the block allocation data structures are described in U.S. Patent Application Publication No. US2002/0083037 A1, titled Instant Snapshot, by Blake Lewis et al. and published on Jun. 27, 2002, which application is hereby incorporated by reference.

The write-anywhere file system typically performs write allocation of blocks in a logical volume in response to an event in the file system (e.g., dirtying of the blocks in a file). When write allocating, the file system uses the block allocation data structures to select free blocks within its vbn space to which to write the dirty blocks. The selected blocks are generally in the same positions along the disks for each RAID group (i.e., within a stripe) so as to optimize use of the parity disks. Stripes of positional blocks may vary among other RAID groups to, e.g., allow overlapping of parity update operations. When write allocating, the file system traverses a small portion of each disk (corresponding to a few blocks in depth within each disk) to essentially lay down a plurality of stripes per RAID group. In particular, the file system chooses vbns that are on the same stripe per RAID group during write allocation using the vbn-to-disk, dbn mappings.

During storage system operation, a volume (or other data container, such as a file or directory) may become corrupted due to, e.g., physical damage to the underlying storage devices, software errors in the storage operating system executing on the storage system or an improperly executing application program that modifies data in the volume. In such situations, an administrator may want to ensure that the volume is promptly mounted and exported so that it is accessible to clients as quickly as possible; this requires that the data in the volume (which may be substantial) be recovered as soon as possible. Often, the data in the volume may be recovered by, e.g., reconstructing the data using stored parity information if the storage devices are utilized in a RAID configuration. Here, reconstruction may occur on-the-fly, resulting in virtually no discernable time where the data is not accessible.

In other situations, reconstruction of the data may not be possible. As a result, the administrator has several options, one of which is to initiate a conventional full restore operation invoking a direct copy of the volume from a point-in-time image stored on another storage system. In the general case, all volume data and metadata must be copied, prior to resuming normal operations, as a guarantee of application consistency. The time taken to complete a full copy of the data is often costly in terms of lost opportunity to run business-critical applications. However, such "brute force" data copying is generally inefficient, as the time required to transfer substantial amounts of data, e.g., terabytes, may be on the order of days. Similar disadvantages are associated with restoring data from a tape device or other offline data storage. Another option that enables an administrator to rapidly mount and export a volume is to generate a hole-filled volume, wherein the contents of the volume are "holes". In this context, holes are manifested as entire blocks of zeros or other predefined pointer values stored within the buffer tree structure of a volume. An example of the use of such holes is described in the U.S. Pat. No. 7,457,982, entitled WRITABLE READ-ONLY SNAPSHOTS, by Vijayan Rajan, the contents of which are hereby incorporated by reference.

In such a hole-filled environment, the actual data is not retrieved from a backing store until requested by a client. However, a noted disadvantage of such a hole-based technique is that repeated write operations are needed to generate the appropriate number of zero-filled blocks on disk for the volume. That is, the use of holes to implement a data container that requires additional retrieval operations to retrieve data further requires that the entire buffer tree of a file and/or volume be written to disk during creation. The time required to perform the needed write operations may be substantial depending on the size of the volume or file. Thus, creation of a hole-filled volume is oftentimes impractical due to the need for quick data access to a volume.

A storage environment in which there is typically a need to quickly bring back (or restore) a volume involves the use of a near line storage server. As used herein, the term "near line storage server" means a secondary storage system adapted to store data forwarded from one or more primary storage systems, typically for long term archival purposes. The near line storage server may be utilized in such a storage environment to provide a back up of data storage (e.g., a volume) served by each primary storage system. As a result, the near line storage server is typically optimized to perform bulk data restore operations, but suffers reduced performance when serving individual client data access requests. This latter situation may arise where a primary storage system encounters a failure that damages its volume in such a manner that a client must send its data access requests to the server in order to access data in the volume. This situation also forces the clients to reconfigure with appropriate network addresses associated with the near line storage server to enable such data access.

SUMMARY OF THE INVENTION

The present invention overcomes the disadvantages of the prior art by providing a system and method for instantiating a sparse volume within a file system of a storage system that is used to restore data from a secondary storage system (backing store) on demand. As described herein, a sparse volume contains one or more files with at least one data block (i.e., an absent block) that is not stored locally on disk (i.e., on a local volume) coupled to the storage system. By not immediately retrieving the data block (or a block of zeros as in a hole environment), the sparse volume may be generated and exported quickly with minimal write operations required. The missing data of an absent block is stored on the alternate, possibly remote, backing store and is illustratively retrieved using a remote fetch operation. Once the restored volume is activated, the volume may be accessed for any file operations, including new write operations. Received write operations are processed normally by allocating a new block and modifying a block pointer to reference the newly allocated data block. If the block pointer was previously marked as absent, it is overwritten as the old data that was remotely stored has been updated, which results in the storage system not needing to remotely retrieve the data.

In the illustrative embodiment, a sparse volume is initialized with volume infrastructure metadata that utilizes special pointers to data stored on the backing store. In the illustrative embodiment, special pointers (ABSENT pointers) are utilized to indicate that the data required a special retrieval operation. Use of these ABSENT pointers present a user, such as a client, with the illusion of an "instant" full restore, thereby avoiding the long wait associated with a conventional full restore operation. The data may then be "restored on demand," which as used herein denotes waiting until a specific request for the data is issued before expending storage system and network resources to acquire the data. Such restoration of data may be accomplished in response to a client issuing a data access request to the storage system, or by a restore module of the system generating a request ("demand") for the data during, e.g., background processing.

One feature of the present invention is that once the restoration has begun, the sparse volume is available for all operations, including, e.g., accepting new modifications (write operations) directed to the sparse volumes. These write operations are written to the sparse volume and any new pointers that are written overwrite any ABSENT pointers to thereby signify that if a read operation is received the data should be retrieved from the sparse volume and not from the backing store. Thus, if a particular block is labeled SPARSE and a write operation is directed to it, the block is no longer labeled sparse. Any subsequent read operations will return the newly written data and will not require a remote fetch operation.

According to an aspect of the invention, the restore module is embodied as a novel demand generator configured to scan the sparse volume, searching for blocks with ABSENT pointers. Upon locating such a block, the demand generator initiates a remote fetch operation to retrieve the missing data referenced by each ABSENT pointer from the backing store. The retrieved data is then write allocated to populate the sparse volume. Population of the sparse volume with missing data preferably occurs in connection with a multi-phase projected sequence until there are no absent blocks remaining in the file system. Illustratively, these phases include the inode file, directories and files. In alternative embodiments, the phases may be the inode file, special data containers, directories and files. The special data containers may comprise, for example, hidden or file system metadata containers such as special directories. At this time, the sparse volume transitions to a fully restored detached local volume. The demand generator may also be configured to utilize a special load path that bypasses a buffer cache of the storage system so as not to "pollute" that cache with retrieved data not currently needed by the client. In addition, the demand generator may implement a read-ahead feature to enhance retrieval of data associated with a sequence of remote fetch operations.

According to another aspect of the present invention, a pump module of the storage system provides flow control to the demand generator. In the event the number of outstanding demands and requests for data missing from the sparse volume reaches a predetermined threshold, the pump module regulates the demand generator to slow down or temporarily pause the number of demands it generates. The pump module may further implement a priority policy that, e.g., grants precedence to client issued requests over generated demands for missing data in the event available system resources are limited.

Advantageously, a sparse volume of a storage system may be instantiated to quickly restore a local volume that has failed. To that end, the demand generator and pump modules cooperate to permit efficient access to data that is not physically stored on the storage system without requiring transfer of an entire copy of the local volume before serving data access requests. Moreover, the novel modules ensure that all missing data is eventually restored to the sparse volume, bringing it to a fully detached volume state in an efficient manner.

Another advantage of the present invention is that backup operations to the remote backing store may be resumed while a restore operation is ongoing. This enables new client updates to be backed up, which enables later restoration should a second disaster recovery operation need to be initiated.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network Environment

Figure 1:
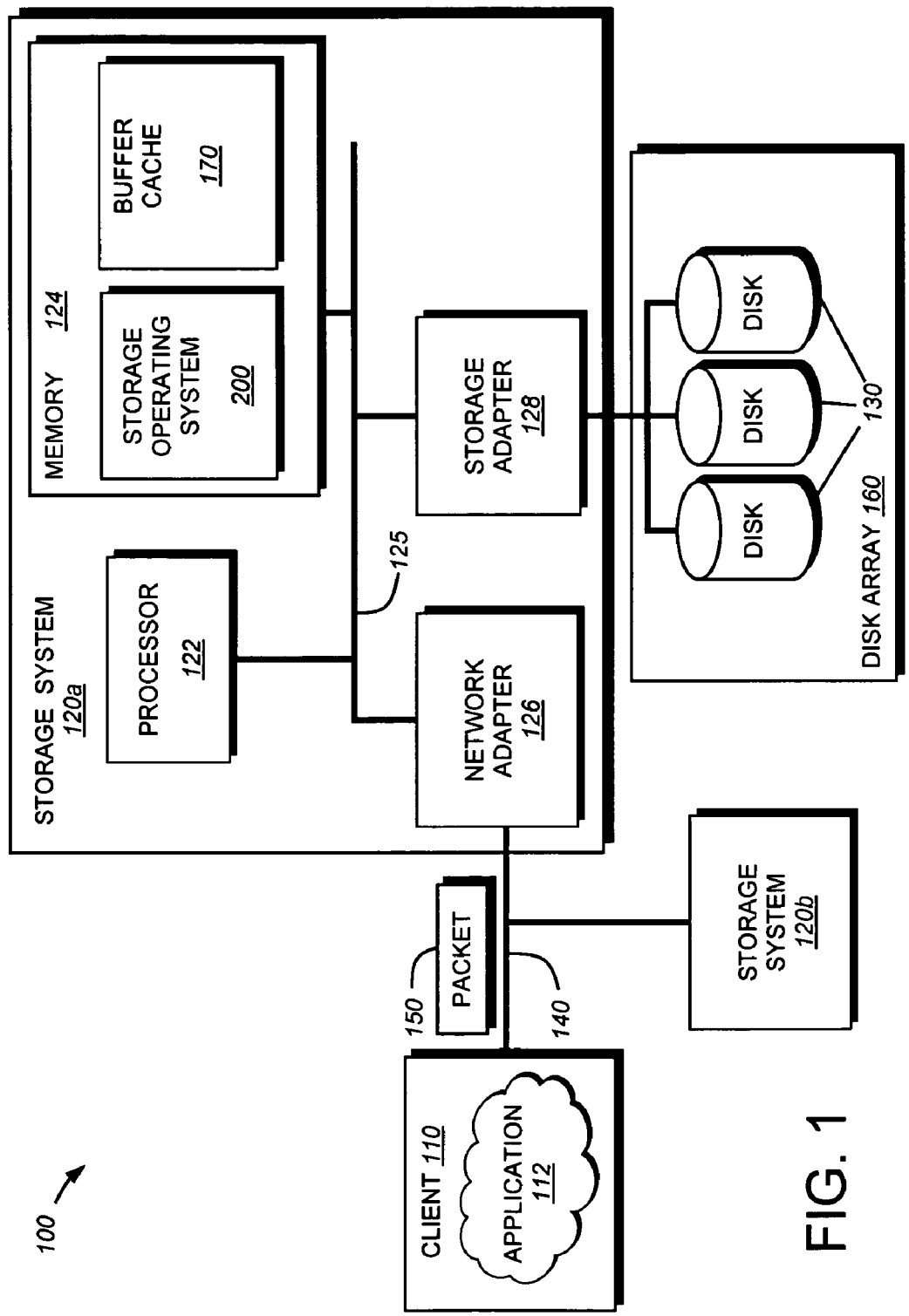
FIG. 1 is a schematic block diagram of an exemplary network environment in accordance with an embodiment of the present invention.

FIG. 1 is a schematic block diagram of an environment 100 including a storage system 120a that may be advantageously used with the present invention. The storage system is a computer that provides storage service relating to the organization of information on storage devices, such as disks 130 of a disk array 160. The storage system 120a comprises a processor 122, a memory 124, a network adapter 126 and a storage adapter 128 interconnected by a system bus 125. The storage system 120a also includes a storage operating system 200 that preferably implements a high-level module, such as a file system, to logically organize the information as a hierarchical structure of directories, files and special types of files called virtual disks (hereinafter "blocks") on the disks.

In the illustrative embodiment, the memory 124 comprises storage locations that are addressable by the processor and adapters for storing software program code. A portion of the memory may be further organized as a buffer cache 170 for storing certain data structures associated with the present invention. The processor and adapters may, in turn, comprise processing elements and/or logic circuitry configured to execute the software code and manipulate the data structures. Storage operating system 200, portions of which are typically resident in memory and executed by the processing elements, functionally organizes the system 120a by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120a to a client 110 over a computer network 140, which may comprise a point-to-point connection or a shared medium, such as a local area network (LAN) or wide area network (WAN). Illustratively, the computer network 140 may be embodied as an Ethernet network or a Fibre Channel (FC) network. The client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120a in accordance with a client/server model of information delivery. That is, the client may request the services of the storage system, and the system may return the results of the services requested by the client, by exchanging packets 150 over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120a to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data stripes across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Additionally, a second storage system 120b is operatively interconnected with the network 140. The second storage system 120b may be configured as a near line storage server. The storage system 120b generally comprises hardware similar to storage system 120a; however, it may alternatively execute a modified storage operating system that adapts the storage system for use as a near line storage server. In alternate embodiments, there may be a plurality of additional storage systems (generally referred to herein as 120) in environment 100.

B. Storage Operating System

To facilitate access to the disks 130, the storage operating system 200 implements a write-anywhere file system that cooperates with virtualization modules to virtualize the storage space provided by disks 130. The file system logically organizes the information as a hierarchical structure of named directories and files on the disks. Each on-disk file may be implemented as set of disk blocks configure to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any file system that is otherwise adaptable to the teachings of this invention.

Figure 2:
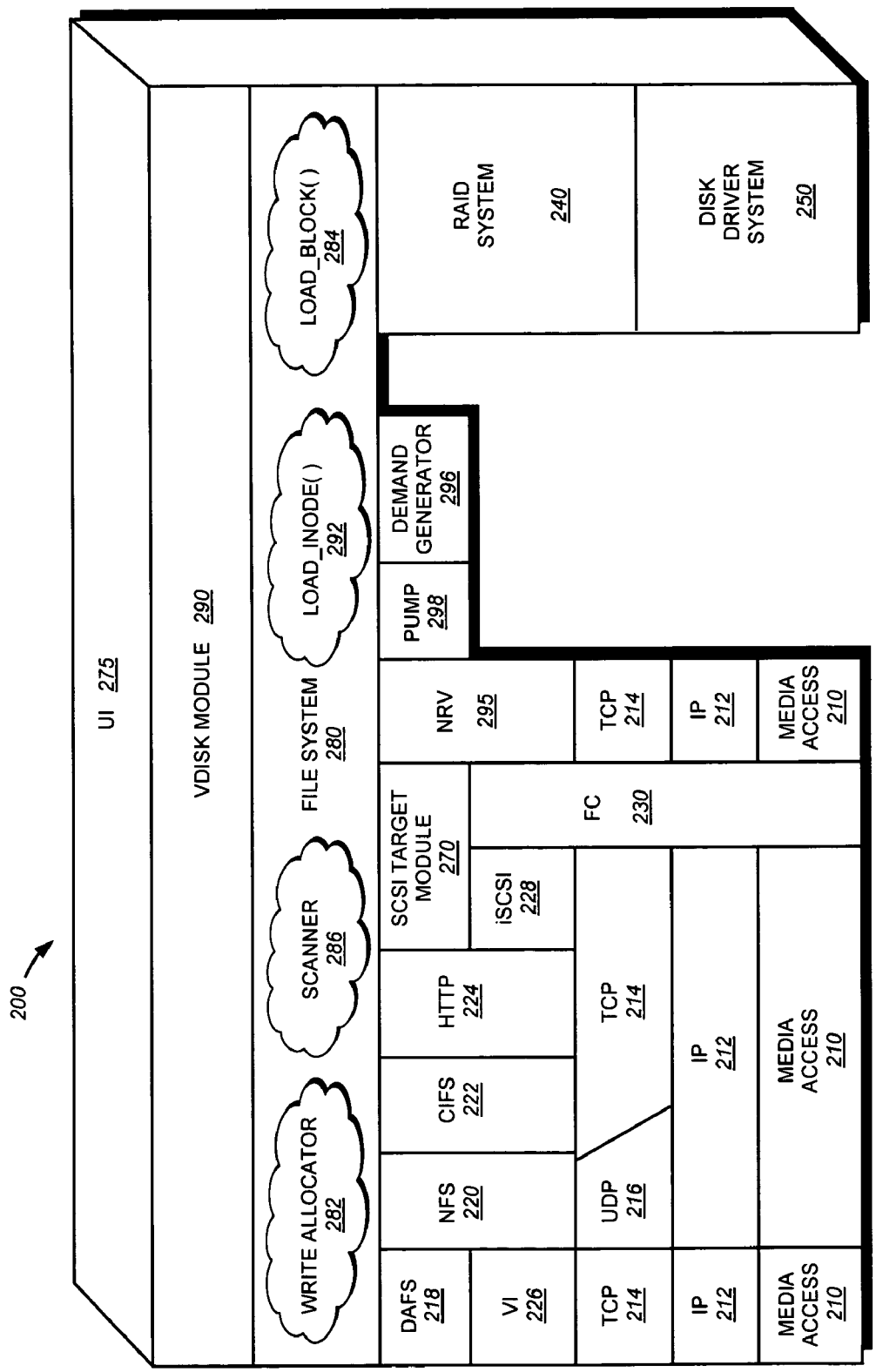
FIG. 2 is a schematic block diagram of an exemplary storage operating system in accordance with an embodiment of the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

The storage operating system 200 further comprises an NRV protocol layer 295 that interfaces with file system 280. The Network Appliance Remote Volume (NRV) protocol is generally utilized for remote fetching of data blocks that are not stored locally on disk. However, as described herein, the NRV protocol may be further utilized in storage system-to-storage system communication to fetch absent blocks in a sparse volume in accordance with the principles of the present invention. It should be noted that, in alternate embodiments, conventional file/block level protocols, such as the NFS protocol, or other proprietary block fetching protocols may be used in place of the NRV protocol within the teachings of the present invention.

In accordance with the present invention, and as described in further detail herein, a demand generator 296 of the storage operating system 200 is used to systematically retrieve data blocks that are not stored locally on disk, i.e., on a local volume of storage system 120a, while a pump module 298 may be used to regulate the retrieval of those data blocks. Although they are shown and described herein as separate software modules, the demand generator 296 and the pump module 298 may be alternatively integrated within a single module of the operating system. Moreover, it should be noted that the demand generator and the pump module may be implemented as hardware, software, firmware, or any combination thereof.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, such as a user interface (UI) 275, in response to a user (such as a system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to the various layers and systems.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the root fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 110 is forwarded as a packet 150 over the computer network 140 and onto the storage system 120a where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in core", i.e., in the buffer cache 170. Illustratively this operation may be embodied as a Load_Block( ) function 284 of the file system 280. If the information is not in the cache, the file system 280 indexes into the inode file using the inode number to access an appropriate entry and retrieve a logical vbn. The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 130 and loads the requested data block(s) in buffer cache 170 for processing by the storage system. Upon completion of the request, the storage system (and operating system) returns a reply to the client 110 over the network 140.

The file system 280 generally provides the Load_Block( ) function 284 to retrieve one or more blocks from disk. These blocks may be retrieved in response to a read request or an exemplary read ahead algorithm directed to, e.g., a file. As described further herein, if any requested blocks within a buffer tree of the file contain a special ABSENT value (thereby denoting absent blocks), then the Load_Block( ) function 284 initiates a fetch operation to retrieve the absent blocks from an appropriate backing store using the illustrative NRV protocol 295. Once the blocks (including any data blocks) have been retrieved, the Load_Block( ) function 284 returns with the requested data. The NRV protocol is further described in the above-referenced U.S. patent application, entitled ARCHITECTURE FOR SUPPORT OF SPARSE VOLUMES, by Jason Lango et al. However, it should be noted that any other suitable file or block based protocol that can retrieve data from a remote backing store, including, e.g., the NFS protocol, can be advantageously used with the present invention. The file system also illustratively includes a Load_Inode( ) function 292 that retrieves inode and file geometry when first accessing a file.

It should be further noted that the software path through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configure to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configure for storage applications as described herein.

In addition, it will be understood to those skilled in the art that the inventive system and method described herein may apply to any type of special-purpose (e.g., file server, filer or multi-protocol storage appliance) or general-purpose computer, including a standalone computer or portion thereof, embodied as or including a storage system 120. An example of a multi-protocol storage appliance that may be advantageously used with the present invention is described in U.S. Patent Publication No. 2004/030668 titled MULTI-PROTOCOL STORAGE APPLIANCE THAT PROVIDES INTEGRATED SUPPORT FOR FILE AND BLOCK ACCESS PROTOCOLS, published on Feb. 12, 2004. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configure to perform a storage function and associated with other equipment or systems.

C. File System Organization

Figure 3:
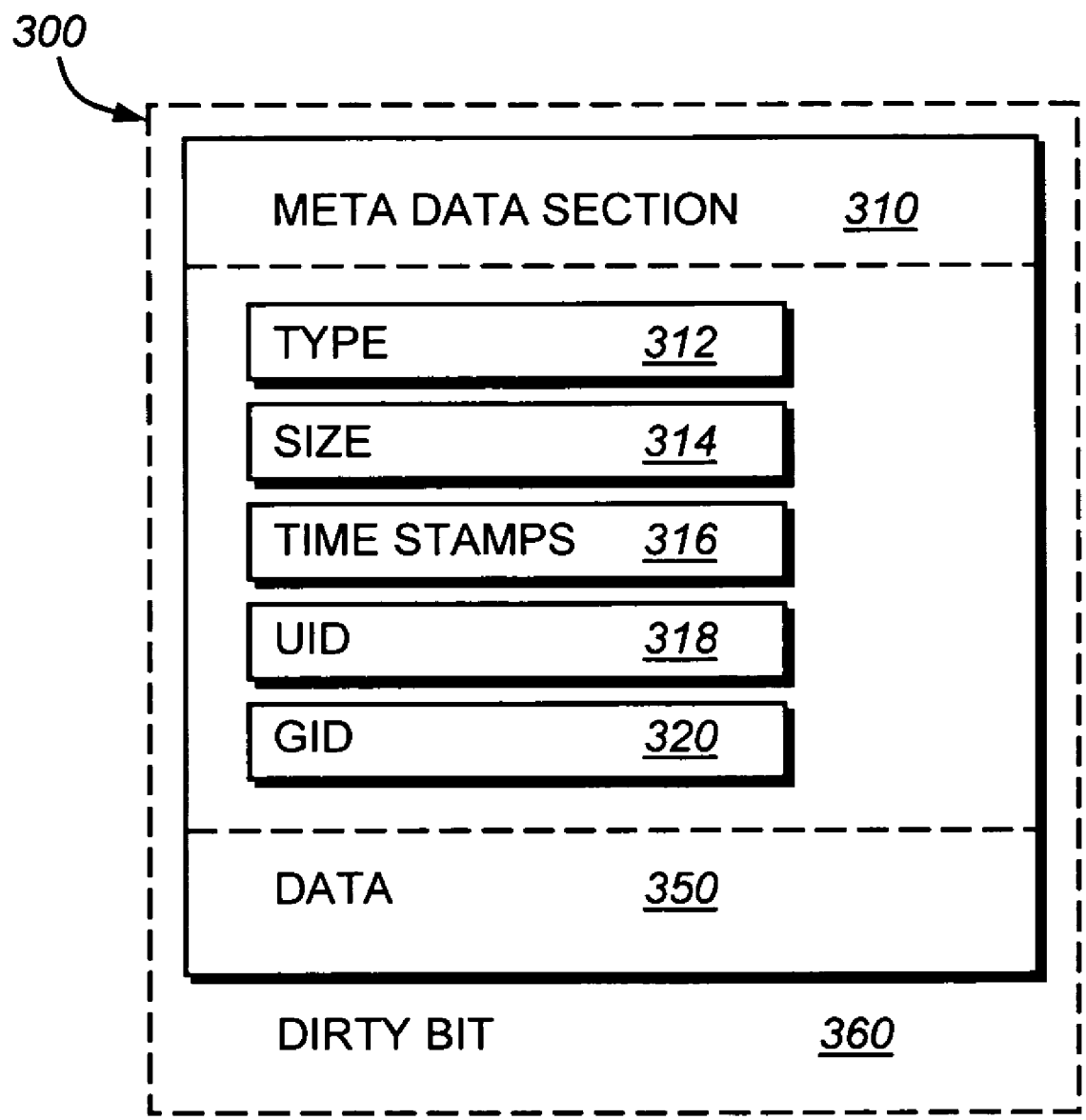
FIG. 3 is a schematic block diagram of an exemplary inode in accordance with an embodiment of the present invention.

In the illustrative embodiment, a file is represented in the write-anywhere file system as an inode data structure adapted for storage on the disks 130. FIG. 3 is a schematic block diagram of an inode 300, which preferably includes a metadata section 310 and a data section 350. The information stored in the metadata section 310 of each inode 300 describes the file and, as such, includes the type (e.g., regular, directory, virtual disk) 312 of file, the size 314 of the file, time stamps (e.g., access and/or modification) 316 for the file and ownership, i.e., user identifier (UID 318) and group ID (GID 320), of the file. The contents of the data section 350 of each inode, however, may be interpreted differently depending upon the type of file (inode) defined within the type field 312. For example, the data section 350 of a directory inode contains metadata controlled by the file system, whereas the data section of a regular inode contains file system data. In this latter case, the data section 350 includes a representation of the data associated with the file.

Specifically, the data section 350 of a regular on-disk inode may include file system data or pointers, the latter referencing 4 KB data blocks on disk used to store the file system data. Each pointer is preferably a logical vbn to facilitate efficiency among the file system and the RAID system 240 when accessing the data on disks. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 350 of the inode (e.g., a second level inode) references an indirect block (e.g., a first level block) that contains up to 1024 pointers, each of which references a 4 KB data block on disk. For file system data having a size greater than 64 MB, each pointer in the data section 350 of the inode (e.g., a third level inode) references a double-indirect block (e.g., a second level block) that contains up to 1024 pointers, each referencing an indirect (e.g., a first level) block. The indirect block, in turn, contains 1024 pointers, each of which references a 4 KB data block on disk. When accessing a file, each block of the file may be loaded from disk 130 into the buffer cache 170.

When an on-disk inode (or block) is loaded from disk 130 into buffer cache 170, its corresponding in core structure embeds the on-disk structure. For example, the dotted line surrounding the inode 300 (FIG. 3) indicates the in core representation of the on-disk inode structure. The in core structure is a block of memory that stores the on-disk structure plus additional information needed to manage data in the memory (but not on disk). The additional information may include, e.g., a dirty bit 360. After data in the inode (or block) is updated/modified as instructed by, e.g., a write operation, the modified data is marked dirty using the dirty bit 360 so that the inode (block) can be subsequently "flushed" (stored) to disk. The in core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 4:
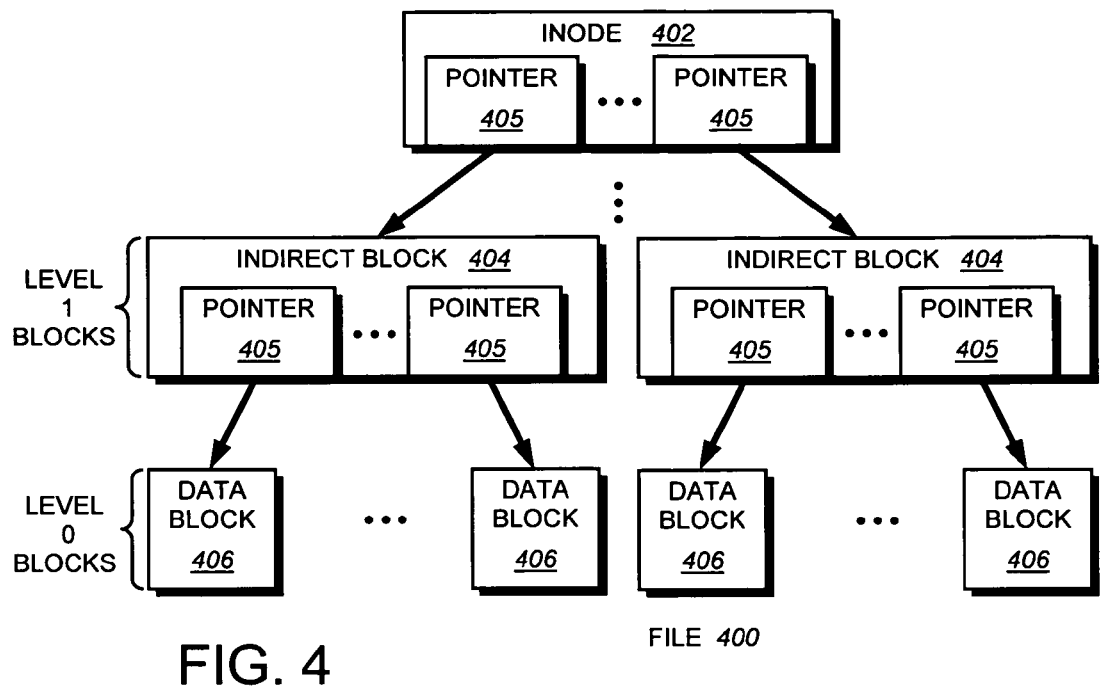
FIG. 4 is a schematic block diagram of an exemplary buffer tree in accordance with an embodiment of the present invention.

FIG. 4 is a schematic block diagram of an embodiment of a buffer tree of a file that may be advantageously used with the present invention. The buffer tree is an internal representation of blocks for a file (e.g., file 400) loaded into the buffer cache 170 and maintained by the write-anywhere file system 280. A root (top-level) inode 402, such as an embedded inode, references indirect (e.g., level 1) blocks 404. Note that there may be additional levels of indirect blocks (e.g., level 2, level 3) depending upon the size of the file. The indirect blocks (and inode) contain pointers 405 that ultimately reference data blocks 406 used to store the actual data of the file. That is, the data of file 400 are contained in data blocks and the locations of these blocks are stored in the indirect blocks of the file. Each level 1 indirect block 404 may contain pointers to as many as 1024 data blocks. According to the "write anywhere" nature of the file system, these blocks may be located anywhere on the disks 130.

A file system layout is provided that apportions an underlying physical volume into one or more virtual volumes (vvols) of a storage system. An example of such a file system layout is described in U.S. Pat. No. 7,409,494 titled EXTENSION OF WRITE ANYWHERE FILE SYSTEM LAYOUT, by John K. Edwards et al. and assigned to Network Appliance, Inc. The underlying physical volume is an aggregate comprising one or more groups of disks, such as RAID groups, of the storage system. The aggregate has its own physical volume block number (pvbn) space and maintains metadata, such as block allocation structures, within that pvbn space. Each vvol has its own virtual volume block number (vvbn) space and maintains metadata, such as block allocation structures, within that vvbn space. Each vvol is a file system that is associated with a container file; the container file is a file in the aggregate that contains all blocks used by the vvol. Moreover, each vvol comprises data blocks and indirect blocks that contain block pointers that point at either other indirect blocks or data blocks.

In one embodiment, pvbns are used as block pointers within buffer trees of files (such as file 400) stored in a vvol. This "hybrid" vvol embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a vvol is generally the same, following pvbns (instead of vvbns) to find appropriate locations of blocks; in this context, the read path (and corresponding read performance) of a vvol is substantially similar to that of a physical volume. Translation from pvbn-to-disk,dbn occurs at the file system/RAID system boundary of the storage operating system 200.

Figure 5:
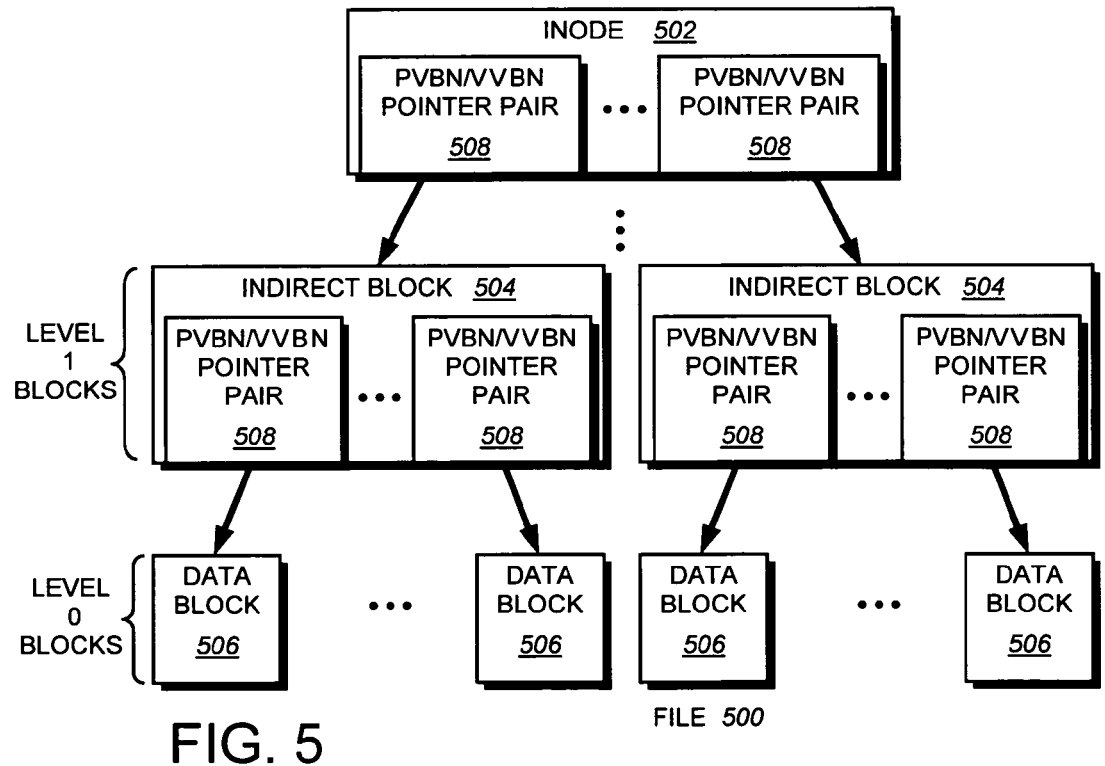
FIG. 5 is a schematic block diagram of an illustrative embodiment of a buffer tree of a file that may be advantageously used with the present invention.

In an illustrative dual vbn hybrid ("flexible") vvol embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 5 is a schematic block diagram of an illustrative embodiment of a buffer tree of a file 500 that may be advantageously used with the present invention. A root (top-level) inode 502, such as an embedded inode, references indirect (e.g., level 1) blocks 504. Note that there may be additional levels of indirect blocks (e.g., level 2, level 3) depending upon the size of the file. The indirect blocks (and inode) contain pvbn/vvbn pointer pair structures 508 that ultimately reference data blocks 506 used to store the actual data of the file.

The pvbns reference locations on disks of the aggregate, whereas the vvbns reference locations within files of the vvol. The use of pvbns as block pointers 508 in the indirect blocks 504 provides efficiencies in the read paths, while the use of vvbn block pointers provides efficient access to required metadata. That is, when freeing a block of a file, the parent indirect block in the file contains readily available vvbn block pointers, which avoids the latency associated with accessing an owner map to perform pvbn-to-vvbn translations; yet, on the read path, the pvbn is available.

As noted, each inode has 64 bytes in its data section that, depending upon the size of the inode file (e.g., greater than 64 bytes of data), function as block pointers to other blocks. For traditional and hybrid volumes, those 64 bytes are embodied as 16 block pointers, i.e., sixteen (16) 4 byte block pointers. For the illustrative dual vbn flexible volume, the 64 bytes of an inode are embodied as eight (8) pairs of 4 byte block pointers, wherein each pair is a vvbn/pvbn pair. In addition, each indirect block of a traditional or hybrid volume may contain up to 1024 (pvbn) pointers; each indirect block of a dual vbn flexible volume, however, has a maximum of 510 (pvbn/vvbn) pairs of pointers.

Moreover, one or more of pointers 508 may contain a special ABSENT value to signify that the object(s) (e.g., an indirect block or data block) referenced by the pointer(s) is not locally stored (e.g., on the volume) and, thus, must be fetched (retrieved) from an alternate backing store. In the illustrative embodiment, the Load_Block( ) function interprets the content of the each pointer and, if a requested block is ABSENT, initiates transmission of an appropriate request (e.g., a remote fetch operation) for the data to a backing store using, e.g. the NRV protocol.

Figure 6:
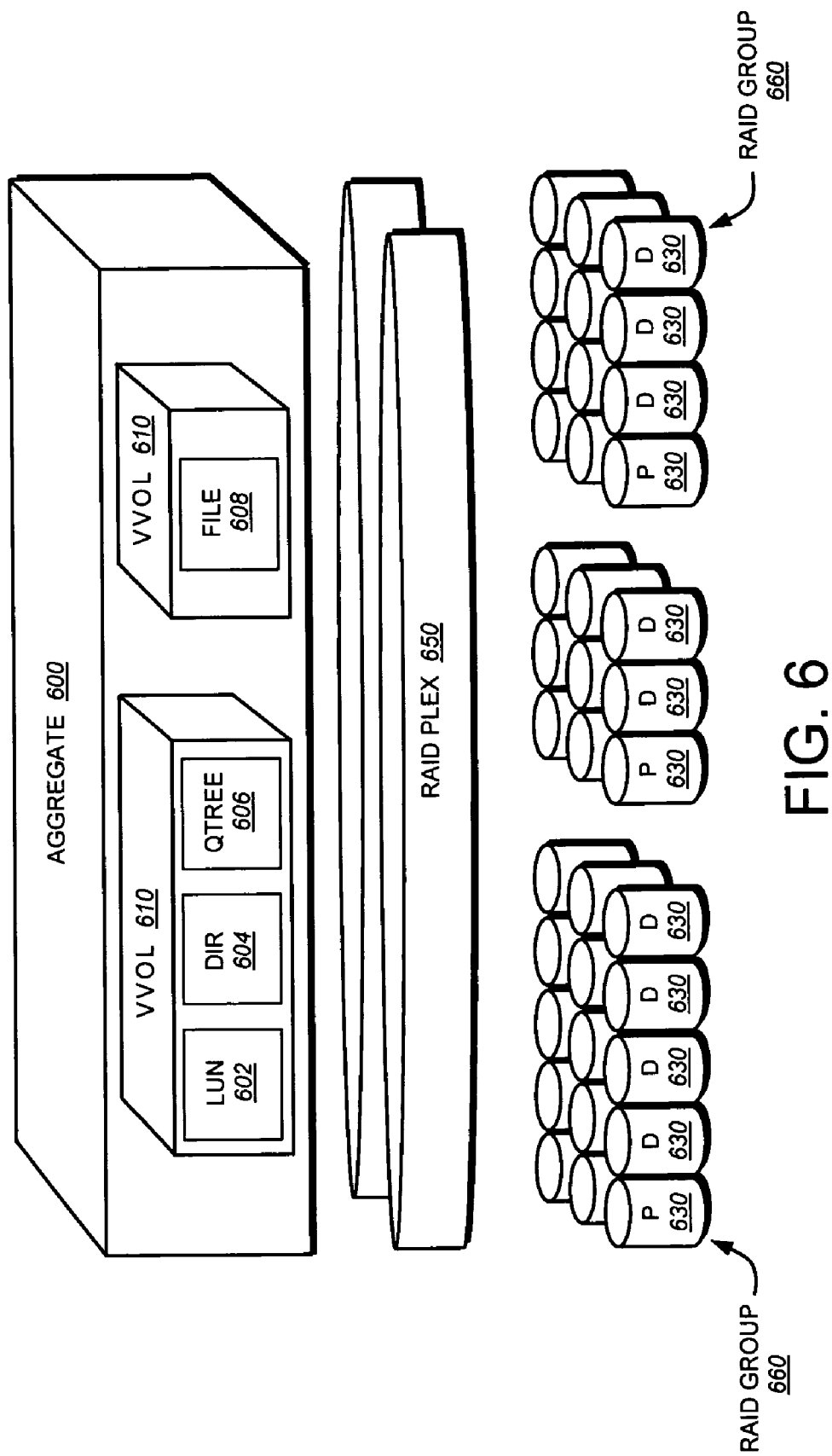
FIG. 6 is a schematic block diagram of an exemplary aggregate in accordance with an embodiment of the present invention.

FIG. 6 is a schematic block diagram of an embodiment of an aggregate 600 that may be advantageously used with the present invention. Luns (blocks) 602, directories 604, qtrees 606 and files 608 may be contained within vvols 610, such as dual vbn flexible vvols, that, in turn, are contained within the aggregate 600. The aggregate 600 is illustratively layered on top of the RAID system, which is represented by at least one RAID plex 650 (depending upon whether the storage configuration is mirrored), wherein each plex 650 comprises at least one RAID group 660. Each RAID group further comprises a plurality of disks 630, e.g., one or more data (D) disks and at least one (P) parity disk.

Whereas the aggregate 600 is analogous to a physical volume of a conventional storage system, a vvol is analogous to a file within that physical volume. That is, the aggregate 600 may include one or more files, wherein each file contains a vvol 610 and wherein the sum of the storage space consumed by the vvols is physically smaller than (or equal to) the size of the overall physical volume. The aggregate utilizes a physical pvbn space that defines a storage space of blocks provided by the disks of the physical volume, while each embedded vvol (within a file) utilizes a logical vvbn space to organize those blocks, e.g., as files. Each vvbn space is an independent set of numbers that corresponds to locations within the file, which locations are then translated to dbns on disks. Since the vvol 610 is also a logical volume, it has its own block allocation structures (e.g., active, space and summary maps) in its vvbn space.

A container file is a file in the aggregate that contains all blocks used by a vvol. The container file is an internal (to the aggregate) feature that supports a vvol; illustratively, there is one container file per vvol. Similar to a pure logical volume in a file approach, the container file is a hidden file (not accessible to a user) in the aggregate that holds every block in use by the vvol. The aggregate includes an illustrative hidden metadata root directory that contains subdirectories of vvols: WAFL/fsid/filesystem file, storage label file Specifically, a physical file system (WAFL) directory includes a subdirectory for each vvol in the aggregate, with the name of subdirectory being a file system identifier (fsid) of the vvol. Each fsid subdirectory (vvol) contains at least two files, a filesystem file and a storage label file. The storage label file is illustratively a 4 kB file that contains metadata similar to that stored in a conventional raid label. In other words, the storage label file is the analog of a raid label and, as such, contains information about the state of the vvol such as, e.g., the name of the vvol, a universal unique identifier (uuid) and fsid of the vvol, whether it is online, being created or being destroyed, etc.

Figure 7:
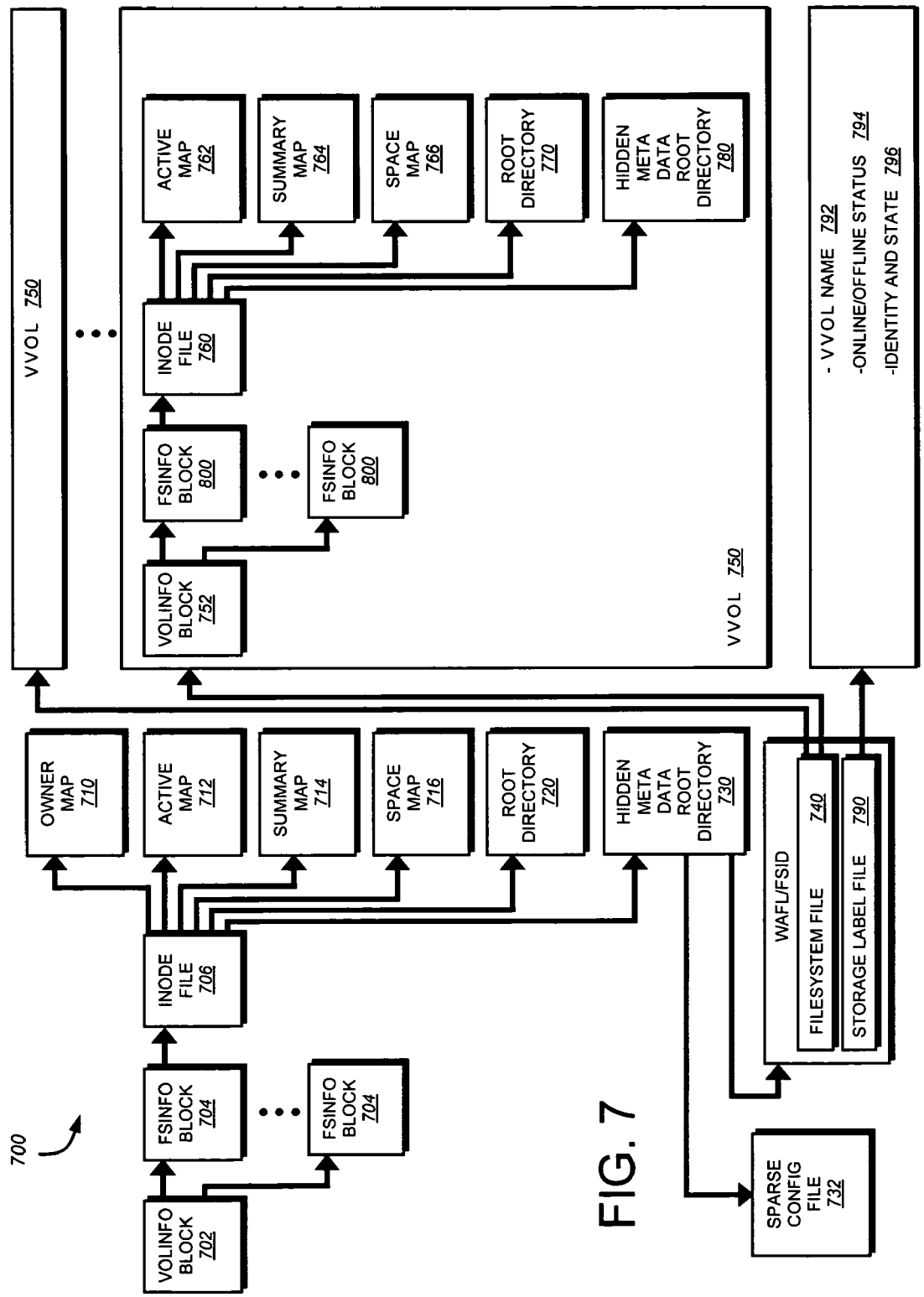
FIG. 7 is a schematic block diagram of an exemplary on-disk layout in accordance with an embodiment of the present invention.

FIG. 7 is a schematic block diagram of an on-disk representation of an aggregate 700. The storage operating system 200, e.g., the RAID system 240, assembles a physical volume of pvbns to create the aggregate 700, with pvbns 1 and 2 comprising a "physical" volinfo block 702 for the aggregate. The volinfo block 702 contains block pointers to fsinfo blocks 704, each of which may represent a snapshot of the aggregate. Each fsinfo block 704 includes a block pointer to an inode file 706 that contains inodes of a plurality of files, including an owner map 710, an active map 712, a summary map 714 and a space map 716, as well as other special metadata files. The inode file 706 further includes a root directory 720 and a "hidden" metadata root directory 730, the latter of which includes a namespace having files related to a vvol in which users cannot "see" the files. The hidden metadata root directory also includes the WAFL/fsid directory structure that contains filesystem file 740 and storage label file 790. Note that root directory 720 in the aggregate is empty; all files related to the aggregate are organized within the hidden metadata root directory 730.

In addition to being embodied as a container file having level 1 blocks organized as a container map, the filesystem file 740 includes block pointers that reference various file systems embodied as vvols 750. The aggregate 700 maintains these vvols 750 at special reserved inode numbers. Each vvol 750 also has special reserved inode numbers within its vvol space that are used for, among other things, the block allocation bitmap structures. As noted, the block allocation bitmap structures, e.g., active map 762, summary map 764 and space map 766, are located in each vvol.

Specifically, each vvol 750 has the same inode file structure/content as the aggregate, with the exception that there is no owner map and no WAFL/fsid/filesystem file, storage label file directory structure in a hidden metadata root directory 780. To that end, each vvol 750 has a volinfo block 752 that points to one or more fsinfo blocks 800, each of which may represent a snapshot, along with the active file system of the vvol. Each fsinfo block, in turn, points to an inode file 760 that, as noted, has the same inode structure/content as the aggregate with the exceptions noted above. Each vvol 750 has its own inode file 760 and distinct inode space with corresponding inode numbers, as well as its own root (fsid) directory 770 and subdirectories of files that can be exported separately from other vvols.

The storage label file 790 contained within the hidden metadata root directory 730 of the aggregate is a small file that functions as an analog to a conventional raid label. A raid label includes physical information about the storage system, such as the volume name; that information is loaded into the storage label file 790. Illustratively, the storage label file 790 includes the name 792 of the associated vvol 750, the online/offline status 794 of the vvol, and other identity and state information 796 of the associated vvol (whether it is in the process of being created or destroyed).

D. Sparse Volumes

The present invention overcomes the disadvantages of the prior art by providing a system and method for instantiating a sparse volume within a file system of a storage system that is used to restore data from a secondary storage system (backing store) on demand. As described herein, a sparse volume contains one or more files with at least one data block (i.e., an absent block) that is not stored locally on disk (i.e., on a local volume) coupled to the storage system. By not storing the data block (or a block of zeros as in a hole environment), the sparse volume may be generated and exported quickly with minimal write operations required. The missing data of an absent block is stored on the alternate, possibly remote, backing store and is illustratively retrieved using a remote fetch operation.

Figure 8:
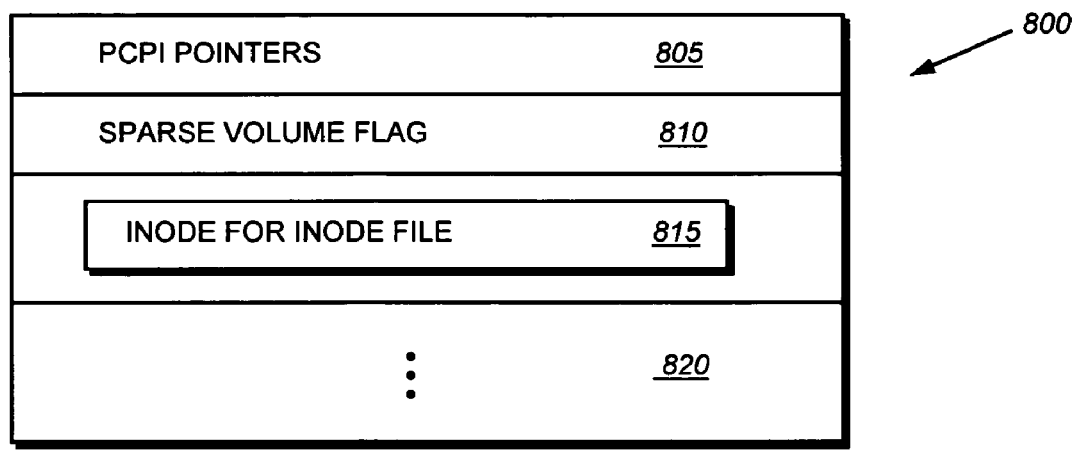
FIG. 8 is a schematic block diagram of an exemplary fsinfo block in accordance with an embodiment of the present invention.

The sparse volume is identified by a special marking of an on-disk structure of the volume (vvol) to denote the inclusion of a file with an absent block. FIG. 8 is a schematic block diagram of the on-disk structure, which illustratively is an exemplary fsinfo block 800. The fsinfo block 800 includes a set of persistent consistency point image (PCPI) pointers 805, a sparse volume flag field 810, an inode for the inode file 815 and, in alternate embodiments, additional fields 820. The PCPI pointers 805 are dual vbn (vvbn/pvbn) pairs of pointers to PCPIs (snapshots) associated with the file system. The sparse volume flag field 810 identifies whether the vvol described by the fsinfo block is sparse. In the illustrative embodiment, a flag is asserted in field 810 to identify the volume as sparse. The sparse volume flag field 810 may be embodied as a type field identifying the type of a vvol associated with the fsinfo block. The inode for the inode file 815 includes the inode containing the root-level pointers to the inode file 760 (FIG. 7) of the file system associated with the fsinfo block.

Appropriate block pointer(s) of the file are marked (labeled) with special ABSENT value(s) to identify that certain block(s), including data and/or indirect blocks, within the sparse volume are not physically located on the storage system serving the volume. The special ABSENT value further alerts the file system that the data is to be obtained from the alternate source, namely a remote backing store, which is illustratively near line storage server 120*b*. In response to a data access request, the Load_Block( ) function 284 of the file system 280 detects whether an appropriate block pointer of a file is marked as ABSENT and, if so, transmits a remote fetch (e.g., read) operation from the storage system to the remote backing store to fetch the required data. The fetch operation illustratively requests one or more file block numbers (fbns) of the file stored on the backing store. It should be noted that while the present description is written in terms of a single backing store, the principles of the present invention may be applied to an environment where a single sparse volume is supported by a plurality of backing stores, each of which may support the entire or a subset of the sparse volume. As such, the teachings should not be taken to be limited to single backing stores.

The backing store retrieves the requested data from its storage devices and returns the requested data to the storage system, which processes the data access request and stores the returned data in its memory. Subsequently, the file system "flushes" (writes) the data stored in memory to local disk during a write allocation procedure. This could be in response to the data being marked as "dirty," or other notation denoting to the file system that the data must be write allocated. In accordance with an illustrative write anywhere policy of the procedure, the file system assigns pointer values (other than ABSENT values) to indirect block(s) of the file to thereby identify location(s) of the data stored locally within the local volume. Thus, the remote fetch operation is no longer needed to access the data.

An example of a write allocation procedure that may be advantageously used with the present invention is described in U.S. Pat. No. 7,430,571 titled, EXTENSION OF WRITE ANYWHERE FILE LAYOUT WRITE ALLOCATION, by John K. Edwards, which application is hereby incorporated by reference. Broadly stated, block allocation proceeds in parallel on the flexible vvol and aggregate when write allocating a block within the vvol, with a write allocator process 282 selecting an actual pvbn in the aggregate and a vvbn in the vvol. The write allocator adjusts block allocation bitmap structures, such an active map and space map, of the aggregate to record the selected pvbn and adjusts similar structures of the vvol to record the selected vvbn. A vvid (vvol identifier) of the vvol and the vvbn are inserted into owner map 710 of the aggregate at an entry defined by the selected pvbn. The selected pvbn is also inserted into a container map (not shown) of the destination vvol. Finally, an indirect block or inode file parent of the allocated block is updated with one or more block pointers to the allocated block. The content of the update operation depends on the vvol embodiment. For a dual vbn hybrid vvol embodiment, both the pvbn and vvbn are inserted in the indirect block or inode as block pointers.

Figure 9:
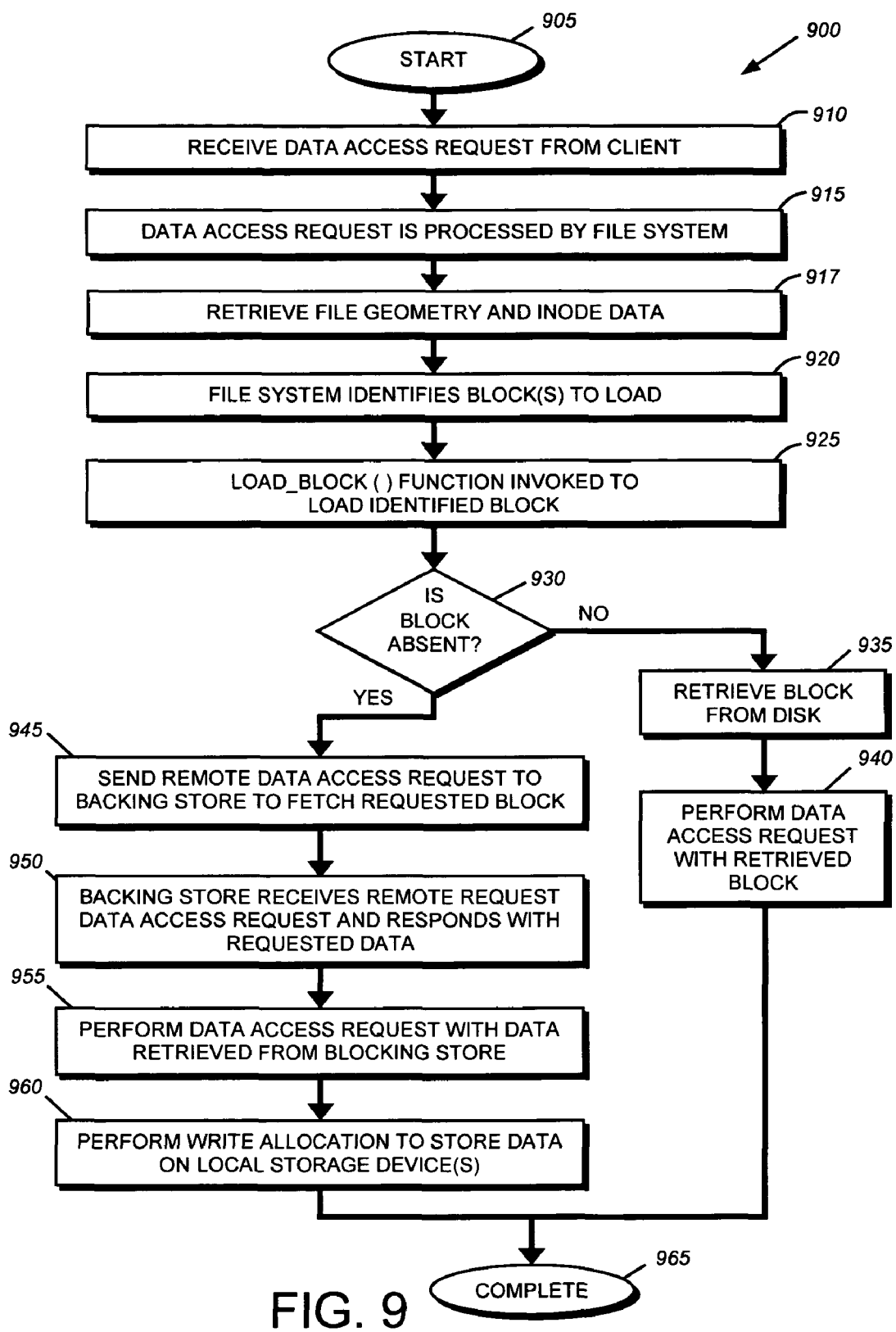
FIG. 9 is a flow chart detailing the steps of a procedure for processing a data access request in accordance with an embodiment of the present invention.

FIG. 9 is a flow chart detailing the steps of a procedure 900 for servicing a data access request (e.g., a read request) directed to a sparse volume. The procedure begins in step 905 and continues to step 910, where the storage system receives a data access request from a client. The data access request is processed by the file system in step 915 by, for example, converting the request to a set of file system primitive operations. Then, in step 917, the appropriate file geometry and inode data is loaded. This may be accomplished using the Load_Inode( ) 292 function, which is further described in the above-incorporated U.S. patent application Ser. No. 11/409,887, entitled SYSTEM AND METHOD FOR SPARSE VOLUMES, by Jason Lango, et al., and U.S. patent application Ser. No. 11/409,624, entitled ARCHITECTURE FOR SUPPORT OF SPARSE VOLUMES, by Jason Lango et al. Generally, the file geometry and inode data permits the storage system to identify the appropriate amount of space to reserve when restoring a file (or other data container) that has ABSENT blocks.

In step 920, the file system identifies one or more blocks to be loaded and, in step 925, invokes the Load_Block( ) function to load one or more of the identified blocks. In step 930, a determination is made as to whether the block(s) is marked ABSENT. This determination may be made, for example, by examining a block pointer referencing the block. If the block is not absent, the procedure branches to step 935 where the block is retrieved from disk and, in step 940, the data access request is performed. In the case of a read request, performance of the request includes returning the retrieved data to the client. The procedure then completes in step 965.

However, if the block is absent (step 930), the procedure continues to step 945, where a remote data access (fetch) request is sent to a backing store to fetch the requested block(s). The fetch request may be issued by a fetch module of the storage operating system, such as the exemplary NRV protocol mentioned herein. As noted above, a plurality of backing stores may be utilized with a sparse volume. In the example of an environment with a plurality of backing stores, metadata contained in a sparse configuration metadata file 732 identifies the appropriate backing store to utilize. The backing store receives the remote data access request and responds with the requested data in step 950. In step 955, the data access request is performed with the data retrieved from the backing store. Subsequently, write allocation is performed to store the retrieved data on one or more local storage devices in step 960. The procedure then completes in step 965.

E. Restore on Demand (ROD)

In the illustrative embodiment, a sparse volume is initialized with volume infrastructure metadata that utilizes pointers (e.g., ABSENT pointers) to data stored on the backing store. Use of these ABSENT pointers present a user, such as a client, with the illusion of an "instant" full restore, thereby avoiding the long wait associated with a conventional full restore operation. The data may then be "restored on demand," which as used herein denotes waiting until a specific request for the data is issued before expending storage system resources to acquire the data. Such restoration of data may be accomplished in response to a client issuing a data access request to the storage system, or by a restore module of the system generating a request ("demand") for the data during, e.g., background processing. In accordance with the present invention, a sparse volume may be instantiated to quickly restore a local volume that has failed. It should be noted that once a restoration of a sparse volume has begun, the sparse volume available for all file system operations including, e.g., new modifications (write operations). Any operations may be performed to the sparse volume once restore on demand has been initiated. For example, a back up operation may be initiated to a sparse volume.

Figure 10:
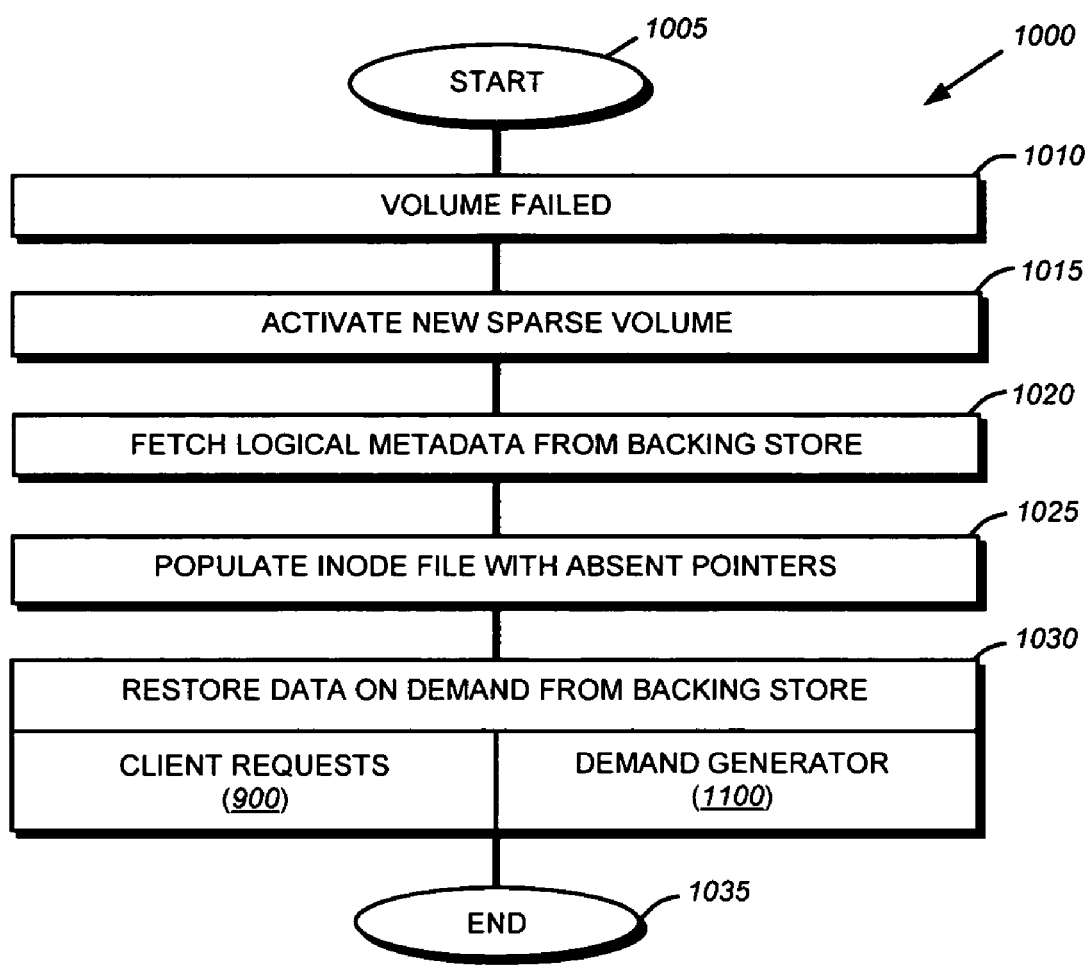
FIG. 10 is a flow chart detailing the steps of a procedure for restoring a failed volume in accordance with an embodiment of the present invention.

FIG. 10 is a flow chart detailing steps of a procedure 1000 for quickly restoring a failed local volume using a sparse volume. The procedure begins in step 1005 and continues to step 1010, where the local volume of the storage system is determined to have failed. The failed volume may be any of a plurality of volumes of the storage system. At step 1015, the sparse volume is instantiated (created) by an administrator or an automated process, by, e.g., entering certain information (e.g. volume name) associated with the sparse volume into the system via the UI 275. In step 1020, the storage system fetches the volume infrastructure metadata from the backing store that is needed to initialize the sparse volume. Typically, the backing store will contain an up-to-date copy of this metadata for the failed volume, but it may also be desirable to restore the metadata from a PCPI or snapshot. The volume infrastructure metadata fetched includes the current file system version, the total size of the volume (number of inodes and/or number of blocks), the content of the root file system directory (root_dir) and other file system specific metadata store in, e.g., volinfo and fsinfo data structures. Notably, the file system data of the sparse volume is absent, as manifested by certain blocks of the inode file being populated (initialized) with ABSENT pointers in step 1025.

Once the infrastructure of the sparse volume is created, at step 1030, the volume is available for any client access. It should be noted that after failure of the local volume, clients may be required to unmount and remount the restored (sparse) volume to ensure that they operate on valid data, rather than previously cached versions of "stale" data. For client-issued requests, restoration of data, including any file system data and remaining metadata, may be accomplished as described above with reference to FIG. 9. In order to restore (retrieve) such data, only logical file information, such as file identification (file ID) numbers, file handles, and offset values need to be transferred between the storage system (primary) and the backing store (secondary). The backing store then returns the requested data to the storage system, which performs write allocation on that data. As a result, "fresh" block allocation information is created for the sparse volume, including new pvbns and vvbns in accordance with the write allocation procedure described above. Thus, it is not necessary to transfer any write allocation files (inode map, summary map, active map, etc.) between the systems. The procedure then ends at step 1035.

The following example describes how a client can access its data on demand once a sparse volume is instantiated to quickly restore a failed local volume. Assume the client wishes to access a file "document.doc" from its directory served by the storage system 120a. The file system accesses the root directory to locate the file in a conventional manner. If the file system encounters any absent blocks within the buffer tree of the file, the blocks are restored from the backing store as described herein. For instance, assume that document.doc is located in a " . . . /users/client/" directory, neither of which are present on the sparse volume. The file system 280 cooperates with the NRV module 295 to issue fetch requests for data from the backing store needed to populate the "users/" directory in order to find the "client/" directory, and then subsequently populate the "client/" directory to locate the document.doc file. Note that while populating the "client/" directory, other directories found in the "users/" directory are not populated, and remain absent (thus space is reserved for the other directories) until needed at a later time. With the file ID and file handle of document.doc, the primary may then restore the file from the secondary in accordance with the present invention. It is possible that the primary storage system may only fetch the particular block or blocks of the file that are requested, and not the entire file. An example of when this may occur is when servicing a client request for a thumbnail of a file in a Microsoft® WINDOWS™ environment.

Demand Generator

In addition to restoring absent data on the sparse volume in response to client requests, it may be desirable to ensure that the entire content of the volume is restored as quickly as possible, yet with minimal file service disruption. Entire volume restoration is desirable because each client access to the remote backing store generates a retrieval delay. Once all of the volume data is restored locally, this delay no longer exists. Also, in the event that the backing store becomes unavailable, data not yet restored on the primary storage system may be lost. This window of vulnerability can be reduced by implementing a restore module of the storage operating system 200 to run as a background process. It should be noted that if the backing store becomes unavailable, the primary storage system may continue to service data access operations until the backing store becomes available and the restore on demand process is restarted. The primary storage system will be able to process write operations and serve any read operations directed to data that has already been restored.

According to an aspect of the invention, the restore module is embodied as the novel demand generator 296 configured to scan the sparse volume, searching for blocks with ABSENT pointers. Upon locating such a block, the demand generator initiates a remote fetch operation to retrieve the missing data referenced by each ABSENT pointer from the backing store. The retrieved data is then write allocated to populate the sparse volume. Population of the sparse volume with missing data preferably occurs in connection with a multi-phase projected sequence until there are no absent blocks remaining in the file system. At this time, the sparse volume transitions to a fully restored detached local volume.

Figure 11:
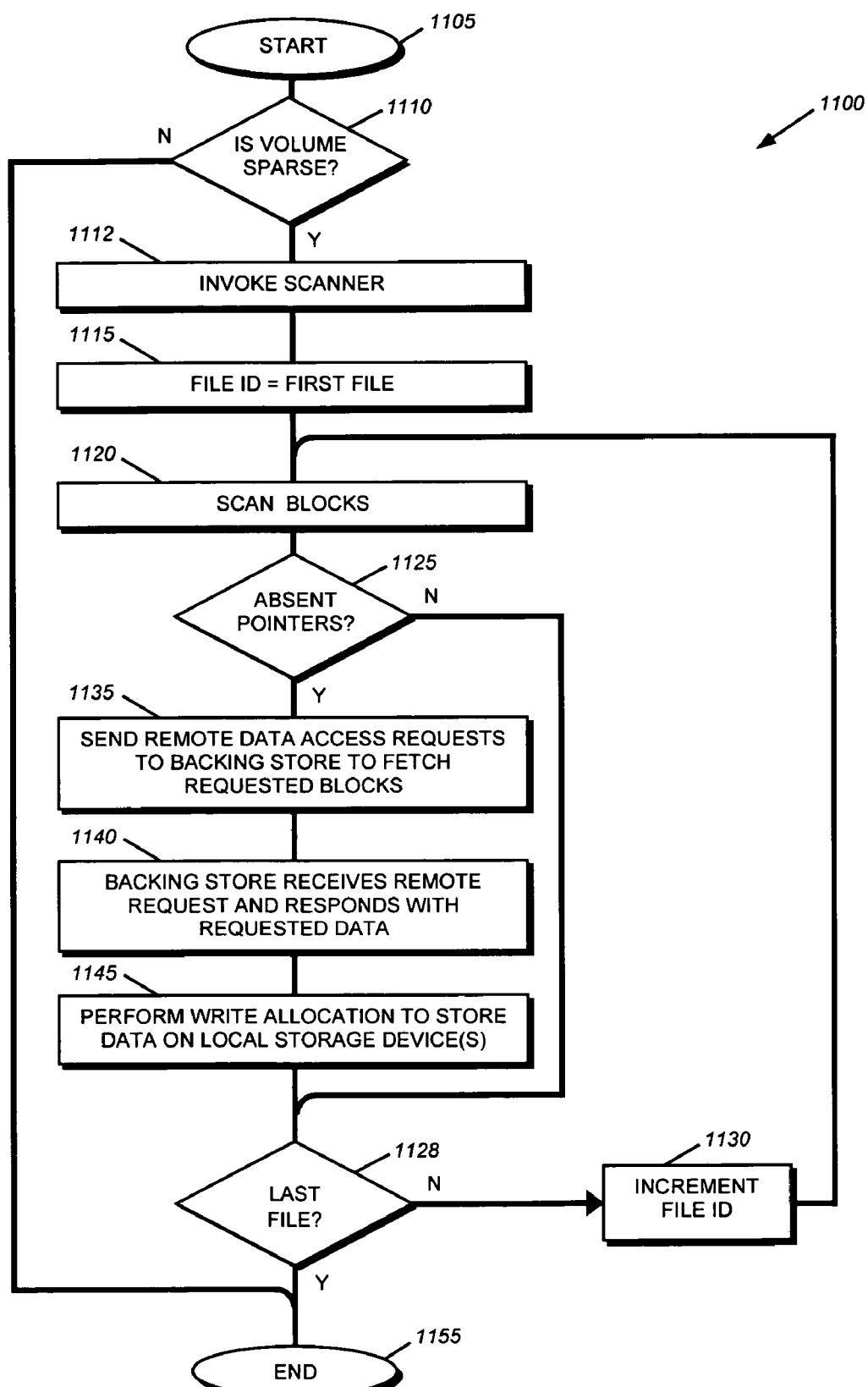
FIG. 11 is a flow chart detailing the steps of a procedure for operating a demand generator in accordance with an embodiment of the present invention.

FIG. 11 is a flow chart illustrating a procedure 1100 for operating the demand generator in accordance with the present invention. The procedure starts at step 1105 and continues to step 1110 where a determination is made as to whether the volume is a sparse volume. In the illustrative embodiment, this determination is preferably rendered by the file system 280, by, as described above, a special indicator or flag located in the sparse volume flag field 810 of the fsinfo block 800 for the volume. If the volume is not sparse, the procedure ends at step 1155. If, on the other hand, the volume is a sparse volume, the procedure continues to step 1112, where the file system cooperates with the demand generator to "walk though" the sparse volume searching for absent blocks. Here, the demand generator illustratively invokes a scanner process 286 of the file system to walk through the volume. Specifically, the scanner starts at a top-level inode, such as the inode of the inode file, and traverses a projected sequence to a last file of the file system. At step 1115, the scanner initializes to a first file of the projected sequence by setting the desired file identifier (ID) to the first file of the file system. It should be noted that in the illustrative WAFL file system, the first file ID may belong to a specific file system file that should already have been recovered (root_dir, active map, etc.), so the file ID for the first actual file may be a value greater than zero (or one).

In step 1120, the scanner scans the blocks of a buffer tree of the file, and in step 1125 determines whether any blocks contain an ABSENT pointer, thus indicating that blocks of the file are absent. If the blocks do not contain an ABSENT pointer, then in step 1128 a determination is made as to whether this is the last file in the sparse volume. If so, the procedure ends in step 1155. If not, the scanner proceeds to the next file, e.g. by incrementing the file ID number in step 1130. The procedure then returns to step 1120.

If an absent block is encountered in step 1125, however, the scanner signals the demand generator to proactively request the data for the absent block from the backing store. In an alternate embodiment, the scanner issues a conventional read request directed to the data. This read request will trigger the fetch operation without invoking the demand generator. In step 1135, the demand generator issues a remote data access (fetch) request to the backing store to fetch a requested data block. The backing store receives the remote data access request and responds with the requested data in step 1140.

Subsequently, write allocation is performed on the retrieved data to store the data on one or more storage devices of the sparse volume in step 1145. During the normal course of write allocation, the remaining portions of the buffer tree for the file are created. Next, at step 1128, it is determined if the file is the last file in the sparse volume, and if so, the procedure ends in step 1155. If not, the scanner proceeds to the next file by incrementing the file ID in step 1130, and returns to step 1120 to scan the blocks of the file. This process continues until all absent blocks have been restored, or until the process is manually stopped. Before reaching the last file in the sparse volume, the file system may also be notified of having restored the last absent block, such as through the sparse volume indication field, in which case the file system may then end the process.

Figure 12:
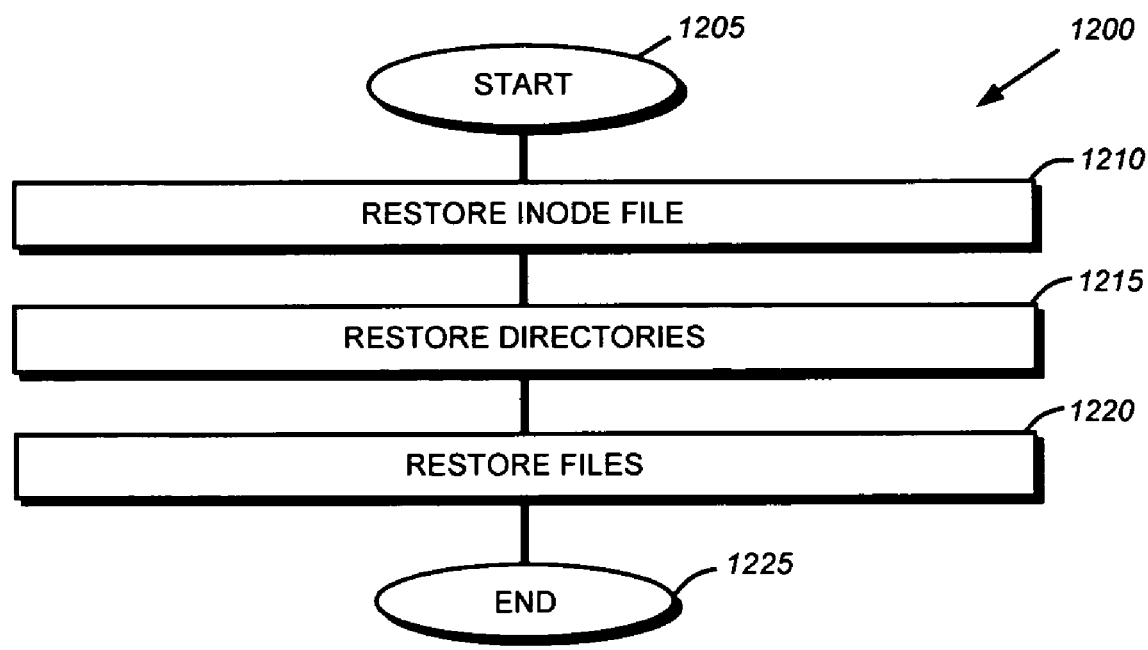
FIG. 12 is a flow chart detailing the steps of a projected sequence traversed by a scanner in accordance with an embodiment of the present invention.

FIG. 12 is a flow chart illustrating an embodiment of the projected sequence traversed by the scanner when scanning a sparse volume. Here, the scanner illustratively traverses a multi-phase projected sequence to populate the sparse volume with missing data. Procedure 1200 starts at step 1205, and continues to step 1210, where the scanner cooperates with the demand generator to restore the blocks of the inode file. Thereafter, in step 1215, the directories are restored, followed by the files in step 1220. As will be understood by those skilled in the art, the inode file and directories are restored first in order for the file system to reach a consistency state as early as possible. The procedure then ends in step 1225.

The demand generator may also be configured to utilize a special load path that bypasses the buffer cache 170 of the storage system 120A so as not to "pollute" that cache with retrieved data not currently needed by the client. For example, while the file system 280 cooperates with the NRV protocol module 295 to restore files that a client 110 may currently be accessing for an application 112, which files may need to be cached for faster continued access, the demand generator 296 may further request the restoration of files that are not currently needed by the client. Hence, these files do not need to be stored in the buffer cache 170 after write allocation to the local volume. It is also important to note that a client request need not be stored on a cache of the secondary backing store because once the date is restored, the primary storage system no longer needs to access it on the secondary.

One way to implement the special load path is to mark the demand generated data in the buffer cache as unnecessary so it may be promptly removed from cache once the data is written to disk. Marking of unnecessary data may be effected through a modified use of a least recently used (LRU) algorithm. When data is to be marked as unnecessary, the cache block (buffer) containing the data is placed at the beginning of an LRU stack, as opposed to the end, so that it is the first buffer to be reused. Alternatively, a new load path transmission link may be created, which physically bypasses any unnecessary caches; however, this alternate solution may require hardware modification. It will be understood by those skilled in the art that other methods of preventing cache pollution may be used within the scope of the present invention.

In addition, the demand generator 296 may implement a read-ahead feature to enhance retrieval of data associated with a sequence of remote fetch operations. Read-ahead algorithms that may be advantageously employed by the demand generator are described in copending U.S. Pat. No. 7,333,993, entitled ADAPTIVE FILE READAHEAD TECHNIQUE FOR MULTIPLE READ STREAMS, by Robert L. Fair, and Patent Publication No. 2005-0154825, entitled ADAPTIVE FILE READAHEAD BASED ON MULTIPLE FACTORS, by Robert L. Fair, which are both expressly incorporated herein by reference. The demand generator may cooperate with the file system 280 to employ a speculative read-ahead operation that retrieves blocks that are likely to be requested by subsequent fetch operations. For example, in response to a read request to retrieve a sequence of consecutive blocks, the file system may invoke read-ahead operations to retrieve additional blocks that further extend the sequence, even though those blocks have yet to be requested by the demand generator. As an example, this could be useful when reading a sequential series of absent blocks.

In still another embodiment, it is possible to utilize multiple demand generators executing in parallel in the storage operating system to expedite data restoration. Here, each demand generator is responsible for only a portion of the blocks in the sparse volume. For example, two demand generators could divide a task into equal portions, wherein the first demand generator is responsible for the first half of sequential addresses and the second generator is responsible for the second half. Those skilled in the art should understand that there are many alternative configurations for multiple demand generators, and that those variant configurations are within the scope and protection of the present invention.

Pump Module

According to another aspect of the present invention, the pump module 298 provides flow control to regulate the processing of demands generated by the demand generator 296, as well as the requests issued by clients 110. Flow control may be needed because the scanner and demand generator are capable of issuing and generating access requests for the blocks of the file system substantially faster than the time required to fetch and restore those blocks from the backing store, primarily because the fetch and restore operations are impacted by network latency, disk access delays (as the data may not be located in the secondary backing store's cache), or other external delays. Accordingly, these fetch and restore operations may become a "bottleneck" with respect to performance of the system, resulting in a "backlog" of outstanding demands and requests.

In the event the number of outstanding demands and requests for data missing from the sparse volume reaches a predetermined threshold, the pump module 298 regulates the demand generator 296 to slow down or temporarily pause the number of demands it generates. The pump module may further implement a priority policy that, e.g., grants precedence to client issued requests over generated demands for missing data in the event available system resources are limited.

Figure 13:
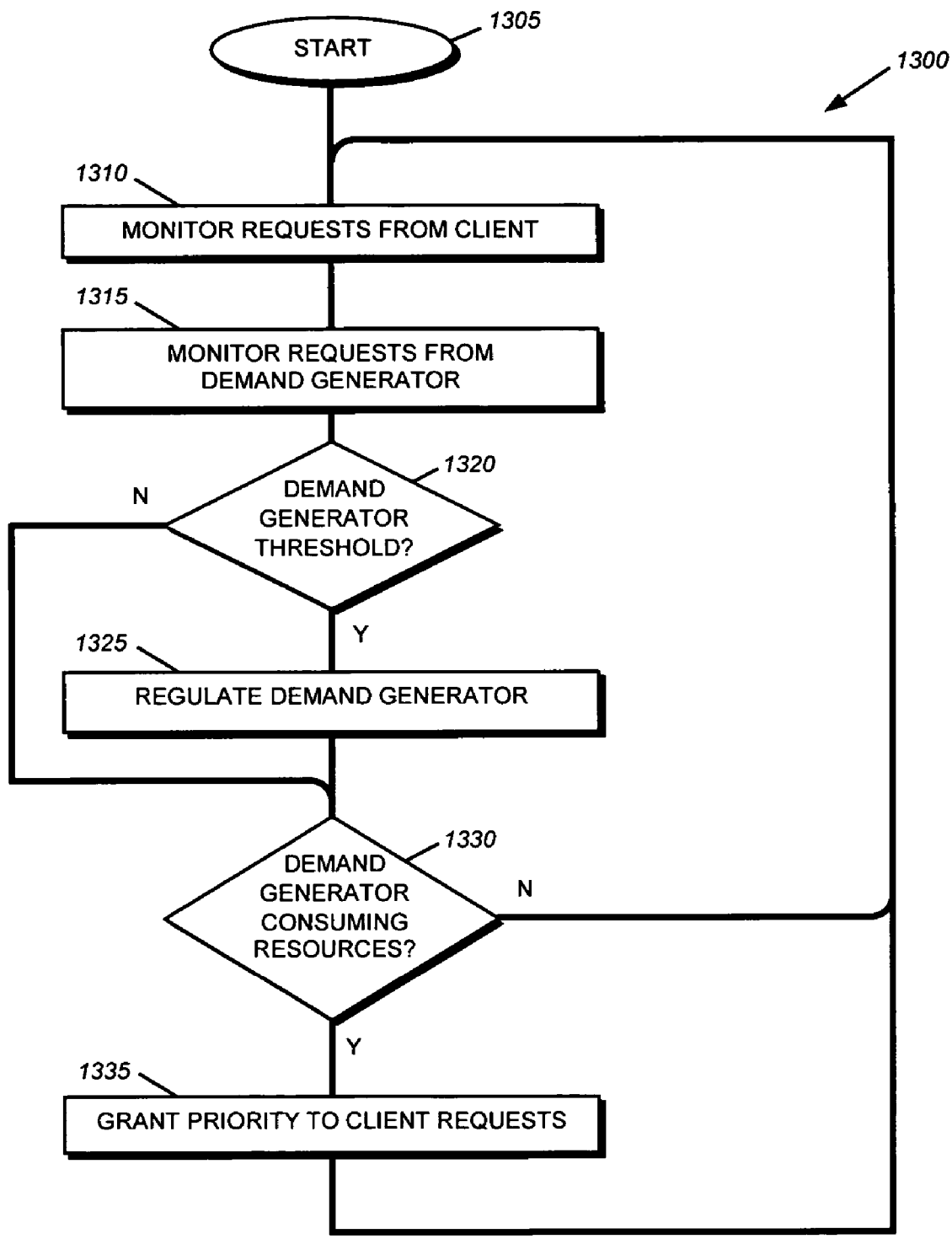
FIG. 13 is a flow chart detailing the steps of a procedure for implementing flow control at a pump module in accordance with an embodiment of the present invention.

FIG. 13 is a flowchart illustrating a procedure 1300 for implementing flow control using the pump module. The procedure starts at step 1305, and continues to step 1310 where data access requests from the client are monitored. At the pump module by, e.g., recording the size and number of those requests. At step 1315, the pump module also monitors the data access requests (demands) generated by the demand generator. In the event the number of requests/demands from the demand generator reaches a predetermined threshold (e.g. a maximum number of requests allowed for the demand generator) at step 1320, the pump module regulates the demand generator at step 1325 to slow or decrease the number of generated demands. Regulation, in this context, may be accomplished in a number of ways, including throttling the scanner, e.g. by adjusting the rate of restore traffic (e.g. 100 kB/sec max), or by pausing it temporarily (until allowing it to resume operation at a later time).

The pump module may also function as a priority mechanism for the demands generated by the demand generator and data access requests issued by the client. In order to maintain the appearance of normal operation during a restore on demand operation, the demand generator must not consume the bandwidth available for restoration, leaving the client with over-delayed file access times. To insure that this situation is avoided, the pump module grants precedence to the requests from the client over those from the demand generator. Specifically, if the demand generator has not reached the maximum threshold at step 1320 or is regulated at step 1325, the pump module determines at step 1330 if the demand generator is over-utilizing (consuming) resources, in a manner that limits available resources for client data access requests. If so, the pump module grants priority to the client data access requests at step 1335 by, e.g., placing the demand generator on hold, and then returns to step 1310 to further monitor the requests. If it is not consuming an abundance of valuable resources, the demand generator is allowed to continue unheeded, and the procedure returns to step 1310. Other types of requests may have different levels of priority, such as, for example, high priority for special file system commands, or low priority for read-aheads.

In one embodiment of the present invention, the pump module may be embodied as a plurality of threads organized to function as a type of queue, through which all data fetch requests to the secondary flow. The pump module may generate the actual fetch requests, using, e.g., the exemplary NRV protocol. Each thread may be assigned to process (i.e., generate and transmit) one request at a time, and wait for a response to that request prior to processing a next request. Yet, through the use of multiple threads, requests can complete out of order. This is similar to what is generally referred to in the art as a leaky bucket algorithm. Moreover, the demand generator can issue demands to the pump module so long as there are a predetermined number of threads available. For example, the pump module may be configured with one hundred threads (i.e., a "one hundred request queue length"), that allows essentially unlimited service of client-issued requests, but that also limits service of demand-generated demands so long as at least ten threads are available. Thus, if no client requests are issued, the demand generator can send up to ninety demands at any one time.

It should be noted that the teachings of the present invention may be utilized with thinly provisioned volumes. Certain file systems, including the exemplary write anywhere file layout (WAFL) file system available from Network Appliance, Inc, of Sunnyvale, Calif., include the capability to generate a thinly provisioned data container, wherein the data container is not completely written to disk at the time of its creation. As used herein, the term data container generally refers to a unit of storage for holding data, such as a file system, disk file, volume or a logical number (LUN), which is addressable by, e.g., its own unique identification. The storage space required to hold the data contents of the thinly provisioned data container on disk has not yet been used. Thinly provisioned data containers are further described in U.S. Patent Publication No. 2006/0085471, entitled SYSTEM AND METHOD FOR RECLAIMING UNUSED SPACE FROM A THINLY PROVISIONED DATA CONTAINER, by Vijajan Rajan, et al.

In a restore on demand environment, the use of thinly provisioned data containers may be utilized for a primary storage system in the event of a disaster recovery scenario. By utilizing a thinly provisioned primary data container, which only has physical storage for a portion of the total amount of the primary volume, an administrator does not need to procure physical storage in the total size of the secondary, but can only provision the amount of space needed for files/data containers that will be used.

To again summarize, the present invention is directed to a system and method for implementing restore on demand (ROD) operation on a sparse volume of a computer, such as a storage system. The sparse volume is a data container or volume wherein one or more files contained therein require a special retrieval operation to obtain the data. According to the present invention, the sparse volume may be used to quickly restore the use of a local storage device once it has failed. The volume is populated with absent blocks, and the data is then restored on demand. The restoration of data may be accomplished as client data access requests are received, or by a demand generator. As noted above, the demand generator may also be regulated by a pump module. Additionally, as noted above, once the restoration of a sparse volume has initiated, the volume is illustratively available for all data access operations so that, for example, write operations may be performed, back up operations initiated, etc.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system, comprising:
   a storage operating system executed by a processor on a first storage system, the storage operating system configured to detect a failed volume served by the first storage system;
   means for detecting the failed volume served by the first storage system, the first storage system executing the storage operating system;
   means for replacing the failed volume with a sparse volume served by the first storage system, wherein the sparse volume comprises at least one pointer of a buffer tree referencing data that is not stored locally on a volume served by the first storage system;
   means for storing volume infrastructure metadata within the sparse volume, wherein the volume infrastructure metadata is copied from a second storage system;
   means for marking the at least one pointer of the buffer tree within the sparse volume with a pointer value, wherein the pointer value identifies that the data referenced by the at least one pointer of the buffer tree is stored on a volume served by the second storage system;
   means for waiting until the data referenced by the at least one pointer of the buffer tree within the sparse volume is requested by scanning the at least one pointer of the buffer tree; and
   means for receiving a request for the data referenced by the at least one pointer of the buffer tree marked with the pointer value and copying, in response to receiving the request, the data referenced by the at least one pointer from the second storage system to the sparse volume.

2. The system of claim 1, further comprising means for initiating a backup operation of the sparse volume to a remote backup volume.

3. A method, comprising:
   detecting a failed volume served by a first storage system, the first storage system executing a storage operating system;

replacing the failed volume with a sparse volume served by the first storage system, wherein the sparse volume comprises at least one pointer of a buffer tree referencing data that is not stored locally on a volume served by the first storage system;

storing volume infrastructure metadata within the sparse volume, wherein the volume infrastructure metadata is copied from a second storage system;

marking the at least one pointer of the buffer tree within the sparse volume with a pointer value, wherein the pointer value identifies that the data referenced by the at least one pointer of the buffer tree is stored on a volume served by the second storage system;

waiting until the data referenced by the at least one pointer of the buffer tree within the sparse volume is requested by scanning the at least one pointer of the buffer tree; and receiving a request for the data referenced by the at least one pointer of the buffer tree marked with the pointer value and copying, in response to receiving the request, the data referenced by the at least one pointer from the second storage system to the sparse volume.

4. The method of claim 3, wherein the pointer value is an ABSENT value.

5. The method of claim 3, wherein the request is a client access request.

6. The method of claim 3, further comprising:
scanning, by a demand generator, the sparse volume; and
initiating, by the demand generator in response to locating the pointer value, the request as a remote fetch operation.

7. The method of claim 3, further comprising processing data access operations directed to the sparse volume.

8. The method of claim 7, wherein the data access operations comprise write operations.

9. The method of claim 3 further comprising initiating a back up operation of the sparse volume to a remote backup volume.

10. The method of claim 3, wherein the failed volume comprises a plurality of objects.

11. The method of claim 10, wherein the objects are luns, directories, qtrees, special data containers, or files.

12. A system for use with a first storage device, comprising:
a first storage system configured to execute a storage operating system, the first storage system comprising a first volume stored across the first storage device, wherein the first storage device is coupled to the first storage system;

a second storage system configured with a backup copy of the first volume, wherein the backup copy is stored on a second storage device coupled to the second storage system;

in response to the first volume failing, the first storage system configured to replace the failed volume with a sparse volume stored across the first storage system, wherein the sparse volume comprises at least one pointer of a buffer tree referencing data that is not stored locally on a volume served by the first storage system, wherein the sparse volume further comprises a plurality of pointer values to identify that the data referenced by the at least one pointer of the buffer tree is stored on the backup copy of the second storage system;

the first storage system further configured to wait until the data referenced by the at least one pointer of the buffer tree within the sparse volume is requested by scanning the at least one pointer of the buffer tree; and the first storage system further configured to receive a request for the data referenced by the at least one pointer of the buffer tree marked with the pointer value and further configured to copy, in response to receiving the request, the data referenced by the at least one pointer of the buffer tree from the second storage system to the sparse volume.

13. The system of claim 12, wherein the request is a client request.

14. The system of claim 12, further comprising a demand generator configured to scan the sparse volume and further configured to initiate the request as a remote fetch operation for the data referenced by the at least one pointer in response to locating the pointer value.

15. The system of claim 14, wherein the first storage system is further configured with a pump module configured to provide flow control of the demand generator.

16. The system of claim 15, wherein the pump module is configured to implement a priority policy that grants precedence to a client issued request over a demand generator generated request.

17. The system of claim 12, wherein the failed volume comprises a plurality of objects.

18. The system of claim 17, wherein the objects are luns, directories, qtrees, special data containers, or files.

19. The system of claim 12, wherein the second storage system is further configured to perform backup operations while restoring to the first storage system.

20. A method, comprising:
configuring an aggregate from a plurality of storage devices attached to a first storage system, wherein the aggregate defines a global storage space of the first storage system;

providing a plurality of volumes stored within the aggregate;

detecting a failed volume on the first storage system;

activating a new volume on the first storage system, wherein the new volume is a sparse volume, wherein the sparse volume comprises at least one pointer of a buffer tree referencing data that is not stored on a volume served by the first storage system;

storing volume infrastructure metadata within the sparse volume, wherein the volume infrastructure metadata is copied from a second storage system;

populating the sparse volume with a pointer value of the at least one pointer of the buffer tree indicating that data referenced by the at least one pointer of the buffer tree is located on the second storage system;

waiting until the data referenced by the at least one pointer of the buffer tree within the sparse volume is requested by scanning the at least one pointer of the buffer tree; and receiving a request for the data referenced by the at least one pointer of the buffer tree with the pointer value and copying, in response to receiving the request, the data referenced by the at least one pointer of the buffer tree from the second storage system to the sparse volume.

21. The method of claim 20, wherein the pointer value is an ABSENT value.

22. The method of claim 20, wherein the failed volume and the new volume are virtual volumes.

23. The method of claim 20, wherein the aggregate is a physical volume.

24. The method of claim 20, wherein the volume infrastructure metadata contains at least one of a current file system version, a total size of the volume, and content of a root file system directory.

25. The method of claim 20, wherein the request is a client request.

26. The method of claim 20, further comprising restoring the data from the second storage system upon receiving a request initiated by a demand generator.

27. The method of claim 26, further comprising:
scanning, by the demand generator the sparse volume to locate blocks with the pointer value.

28. The method of claim 20, further comprising processing data access operations directed to the sparse volume.

29. The method of claim 28, wherein the data access operations comprise write operations.

30. The method of claim 20, further comprising initiating a back up operation of the sparse volume to a remote backup volume.

31. A system, comprising:
an aggregate configured from a plurality of storage devices attached to a first storage system, the first storage system configured to execute a storage operating system, wherein the aggregate defines a global storage space of the first storage system;
a plurality of volumes stored within the aggregate;
in response to a first volume failing on the first storage system, the first storage system is configured to activate a new volume, wherein the new volume is a sparse volume and wherein the sparse volume comprises at least one pointer of a buffer tree referencing data that is not stored on a volume served by the first storage system;
the first storage system is further configured to store volume infrastructure metadata within the sparse volume, wherein the volume infrastructure metadata is copied from a second storage system;
the first storage system is further configured to populate the sparse volume with a pointer value of the at least one pointer of the buffer tree indicating that data referenced by the at least one pointer of the buffer tree is located on the second storage system;
the first storage system is further configured to wait until the data referenced by the at least one pointer of the buffer tree within the sparse volume is requested by scanning the at least one pointer of the buffer tree; and
the first storage system is further configured to receive a request for the data referenced by the at least one pointer of the buffer tree with the pointer value and is further configured to copy, in response to receiving the request, the data referenced by the at least one pointer of the buffer tree from the second storage system to the sparse volume.

32. The system of claim 31, wherein the failed volume and the sparse volume are virtual volumes.

33. The system of claim 31, wherein the aggregate is a physical volume.

34. The system of claim 31, wherein the volume infrastructure metadata contains at least one of a current file system version, a total size of the volume, and content of a root file system directory.

35. A computer readable storage medium containing executable program instructions executed by a processor, comprising:
program instructions that configure an aggregate from a plurality of storage devices attached to a first storage system, wherein the aggregate defines a global storage space of the first storage system;
program instructions that provide a plurality of volume stored within the aggregate;
program instructions that detect a failed volume on the first storage system;
program instructions that activate a new volume on the first storage system, wherein the new volume is a sparse volume, wherein the sparse volume comprises at least one pointer of a buffer tree referencing data that is not stored on a volume served by the first storage system;
program instructions that store volume infrastructure metadata within the sparse volume, wherein the volume infrastructure metadata is copied from a second storage system;
program instructions that populate the sparse volume with a pointer value of the at least one pointer of the buffer tree indicating that data referenced by the at least one pointer of the buffer tree is located on the second storage system;
program instructions that wait until the data referenced by the at least one pointer of the buffer tree within the sparse volume is requested by scanning the at least one pointer of the buffer tree; and
program instructions that receive a request for the data referenced by the at least one pointer of the buffer tree with the pointer value and copy, in response to receiving the request, the data referenced by the at least one pointer of the buffer tree from the second storage system to the sparse volume.

36. The computer readable storage medium of claim 35, wherein the failed volume and the sparse volume are virtual volumes.

37. The computer readable storage medium of claim 35, wherein the request is a client request.

38. The computer readable storage medium of claim 35, wherein the volume infrastructure metadata contains at least one of a current file system version, a total size of the volume, and content of a root file system directory.

* * * * *

UNITED STATES PATENT AND TRADEMARK OFFICE
CERTIFICATE OF CORRECTION

| | | |
|---|---|---|
| PATENT NO. | : 7,809,693 B2 | Page 1 of 1 |
| APPLICATION NO. | : 11/409626 | |
| DATED | : October 5, 2010 | |
| INVENTOR(S) | : Jason Ansel Lango et al. | |

It is certified that error appears in the above-identified patent and that said Letters Patent is hereby corrected as shown below:

Col. 1, Line 20, please replace "herby" with "hereby"

Col. 1, Line 21, please replace "also, related" with "also related"

Signed and Sealed this

Thirtieth Day of November, 2010

David J. Kappos
*Director of the United States Patent and Trademark Office*